US011964482B2

(12) United States Patent
Takabe

(10) Patent No.: US 11,964,482 B2
(45) Date of Patent: Apr. 23, 2024

(54) LIQUID EJECTING HEAD AND LIQUID EJECTING APPARATUS

(71) Applicant: Seiko Epson Corporation, Tokyo (JP)

(72) Inventor: Motoki Takabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 56 days.

(21) Appl. No.: 17/543,323

(22) Filed: Dec. 6, 2021

(65) Prior Publication Data

US 2022/0176699 A1 Jun. 9, 2022

(30) Foreign Application Priority Data

Dec. 9, 2020 (JP) ................................ 2020-203958

(51) Int. Cl.
*B41J 2/14* (2006.01)

(52) U.S. Cl.
CPC .. *B41J 2/14233* (2013.01); *B41J 2002/14491* (2013.01)

(58) Field of Classification Search
None
See application file for complete search history.

(56) References Cited

U.S. PATENT DOCUMENTS

2005/0219328 A1* 10/2005 Kodama .............. B41J 2/14209 347/70
2007/0024680 A1* 2/2007 Katayama ............ B41J 2/14233 347/72
2015/0352844 A1* 12/2015 Miyagishi ........... B41J 2/14233 347/70
2019/0329559 A1 10/2019 Ozawa

FOREIGN PATENT DOCUMENTS

JP 2018-103418 7/2018

* cited by examiner

*Primary Examiner* — Erica S Lin
(74) *Attorney, Agent, or Firm* — WORKMAN NYDEGGER

(57) ABSTRACT

The plurality of pressure compartments includes a first pressure compartment and a second pressure compartment located next to the first pressure compartment in the first direction. The plurality of nozzles includes a first nozzle that is in communication with the first pressure compartment and the second pressure compartment in a shared manner. The piezoelectric element includes a first active region where the piezoelectric body is sandwiched between the common electrode and, among the plurality of individual electrodes, a first individual electrode. The first active region is located to span from at least a part of the first pressure compartment to at least a part of the second pressure compartment as viewed in the second direction.

20 Claims, 14 Drawing Sheets

LIQUID EJECTING HEAD AND LIQUID EJECTING APPARATUS

The present application is based on, and claims priority from JP Application Serial Number 2020-203958, filed Dec. 9, 2020, the disclosure of which is hereby incorporated by reference herein in its entirety.

BACKGROUND

1. Technical Field

Embodiments of the present disclosure relate to a liquid ejecting head and a liquid ejecting apparatus.

2. Related Art

In general, a liquid ejecting head provided in a liquid ejecting apparatus such as a piezoelectric ink-jet printer includes a nozzle, a pressure compartment that is in communication with the nozzle, and a piezoelectric element that changes pressure inside the pressure compartment.

For the purpose of ensuring good liquid ejection even in a case where ink having high viscosity is used or large-diameter droplets are ejected, some apparatuses known in the art are configured to eject, from each one nozzle, liquid supplied from a plurality of pressure compartments as disclosed in, for example, JP-A-2018-103418.

In the apparatus disclosed in JP-A-2018-103418, two pressure compartments that are located at positions different from each other in an intersecting direction (X direction) that intersects with a row direction (Y direction) of pressure compartments are in communication with one nozzle. However, if two pressure compartments that are located at positions different from each other in the intersecting direction are in communication with one nozzle, separation of piezoelectric active regions is needed because pressure compartments that are located next to each other in the row direction are respectively in communication with nozzles that are different from each other. Therefore, active regions have to be formed with high precision. For this reason, deviation in ejection characteristics tends to be large due to a manufacturing error.

SUMMARY

A liquid ejecting head according to a certain aspect of the present disclosure includes: a nozzle substrate in which a plurality of nozzles arranged in a first direction is provided; a pressure compartment substrate in which a plurality of pressure compartments arranged in the first direction is provided; a diaphragm; and a piezoelectric element that includes a common electrode provided in common to the plurality of pressure compartments, a plurality of individual electrodes provided individually for the plurality of pressure compartments, and a piezoelectric body sandwiched between the common electrode and the plurality of individual electrodes; wherein the nozzle substrate, the pressure compartment substrate, the diaphragm, and the piezoelectric element are stacked in a second direction intersecting with the first direction, the plurality of pressure compartments includes a first pressure compartment and a second pressure compartment, the second pressure compartment being located next to the first pressure compartment in the first direction, the plurality of nozzles includes a first nozzle that is in communication with the first pressure compartment and the second pressure compartment in a shared manner, the piezoelectric element includes a first active region where the piezoelectric body is sandwiched between the common electrode and, among the plurality of individual electrodes, a first individual electrode, and the first active region is located to span from at least a part of the first pressure compartment to at least a part of the second pressure compartment as viewed in the second direction.

A liquid ejecting apparatus according to another aspect of the present disclosure includes: the liquid ejecting head according to the above aspect; and a control section that controls operation of ejecting liquid from the liquid ejecting head according to the above aspect.

DESCRIPTION OF EXEMPLARY EMBODIMENTS

Figure 1:
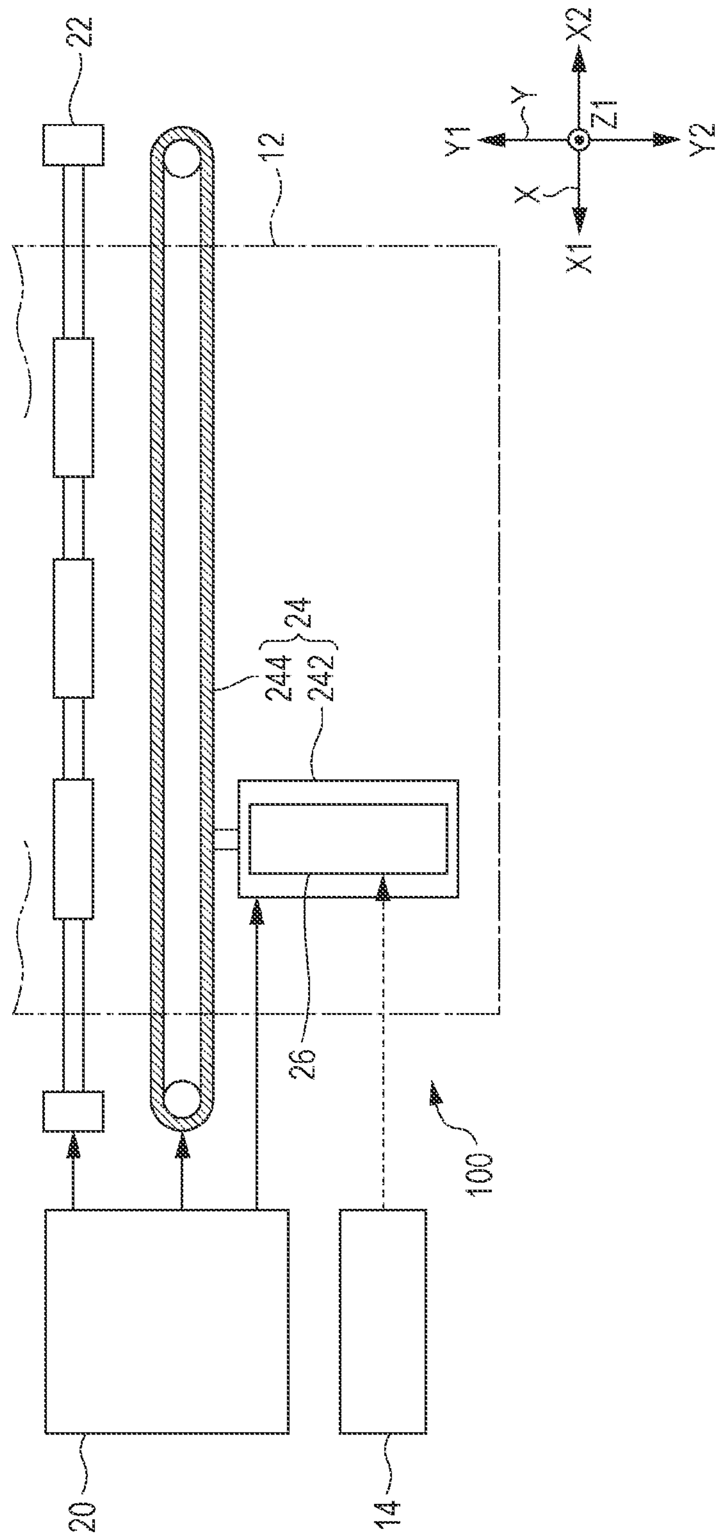
FIG. 1 is a schematic view of an example of the configuration of a liquid ejecting apparatus according to a first embodiment.

With reference to the accompanying drawings, some preferred embodiments of the present disclosure will now be described. The dimensions or scales of parts illustrated in the drawings may be different from actual dimensions or scales, and some parts may be schematically illustrated for easier understanding. The scope of the present disclosure shall not be construed to be limited to these specific examples unless and except where the description below contains an explicit mention of limiting the present disclosure.

The description below is given with reference to X, Y, and Z axes intersecting with one another. One direction along the X axis will be referred to as the X1 direction. The direction that is the opposite of the X1 direction will be referred to as the X2 direction. Similarly, directions that are the opposite of each other along the Y axis will be referred to as the Y1 direction and the Y2 direction. Directions that are the opposite of each other along the Z axis will be referred to as the Z1 direction and the Z2 direction. The Y1 direction or the Y2 direction is an example of "a first direction". The Z1 direction or the Z2 direction is an example of "a second direction". View in the direction along the Z axis will be referred to as "plan view".

Typically, the Z axis is a vertical axis, and the Z2 direction corresponds to a vertically downward direction. However, the Z axis does not necessarily have to be a vertical axis. The X, Y, and Z axes are typically orthogonal to one another, but are not limited thereto. It is sufficient as long as the X, Y, and Z axes intersect with one another within an angular range of, for example, 80° or greater and 100° or less.

1. Exemplary Embodiment

1-1. Overall Configuration of Liquid Ejecting Apparatus

FIG. 1 is a schematic view of an example of the configuration of a liquid ejecting apparatus 100 according to a first embodiment. The liquid ejecting apparatus 100 is an ink-jet-type printing apparatus that ejects droplets of ink, which is an example of a liquid, onto a medium 12. A typical example of the medium 12 is printing paper. The medium 12 is not limited to printing paper. The medium 12 may be a print target made of any material such as, for example, a resin film or a cloth.

As illustrated in FIG. 1, a liquid container 14 that contains ink is attached to the liquid ejecting apparatus 100. Some specific examples of the liquid container 14 are: a cartridge that can be detachably attached to the liquid ejecting apparatus 100, a bag-type ink pack made of a flexible film material, an ink tank which can be refilled with ink, etc. Any type of ink may be contained in the liquid container 14.

The liquid ejecting apparatus 100 includes a control unit 20, a transport mechanism 22, a movement mechanism 24, and a liquid ejecting head 26. The control unit 20 includes a processing circuit, for example, a CPU (central processing unit) or an FPGA (field programmable gate array), and a storage circuit such as a semiconductor memory, etc. The control unit 20 controls the operation of components of the liquid ejecting apparatus 100. The control unit 20 is an example of "a control section" and controls ink-ejecting operation performed by the liquid ejecting head 26.

The transport mechanism 22 transports the medium 12 in the Y2 direction under the control of the control unit 20. The movement mechanism 24 reciprocates the liquid ejecting head 26 in the X1 direction and the X2 direction under the control of the control unit 20. In the example illustrated in FIG. 1, the movement mechanism 24 includes a box-shaped traveler 242 called as a carriage that houses the liquid ejecting head 26, and a transport belt 244 to which the traveler 242 is fixed. The number of the liquid ejecting head(s) 26 mounted on the traveler 242 is not limited to one. Two or more liquid ejecting heads 26 may be mounted. In addition to the liquid ejecting head 26, the liquid container(s) 14 mentioned above may be mounted on the traveler 242.

Under the control of the control unit 20, ink supplied from the liquid container 14 is ejected by the liquid ejecting head 26 from each of a plurality of nozzles toward the medium 12 in the Z2 direction. The ejection is performed in parallel with the transportation of the medium 12 by the transport mechanism 22 and with the reciprocation of the liquid ejecting head 26 by the movement mechanism 24, and, an image is formed due to the landing of the droplets of the ejected ink onto the surface of the medium 12.

As explained above, the liquid ejecting apparatus 100 includes the liquid ejecting head 26 and the control unit 20, which is an example of "a control section" that controls ink-ejecting operation performed by the liquid ejecting head 26.

1-2. Overall Configuration of Liquid Ejecting Head

Figure 2:
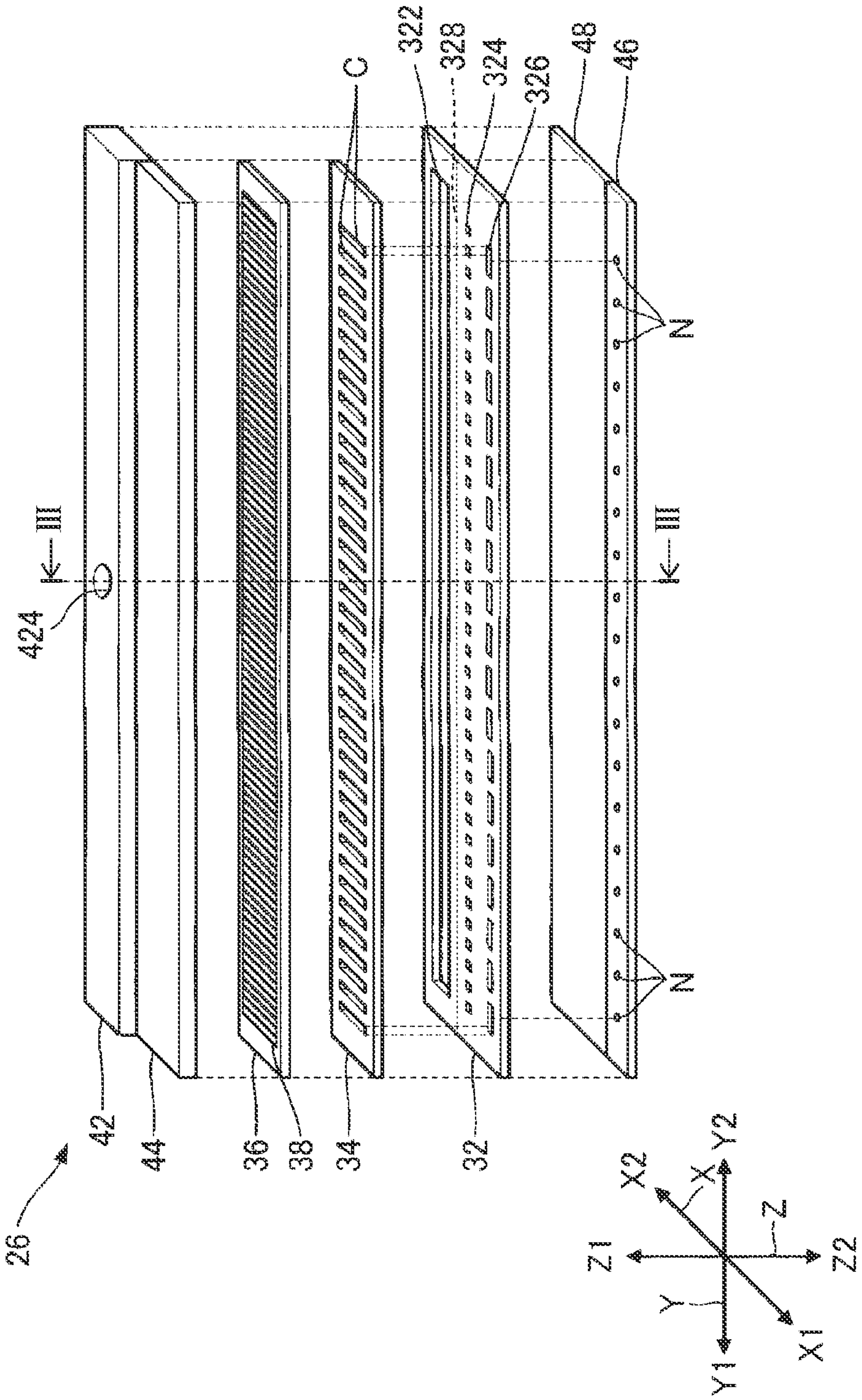
FIG. 2 is an exploded perspective view of a liquid ejecting head according to the first embodiment.
Figure 3:
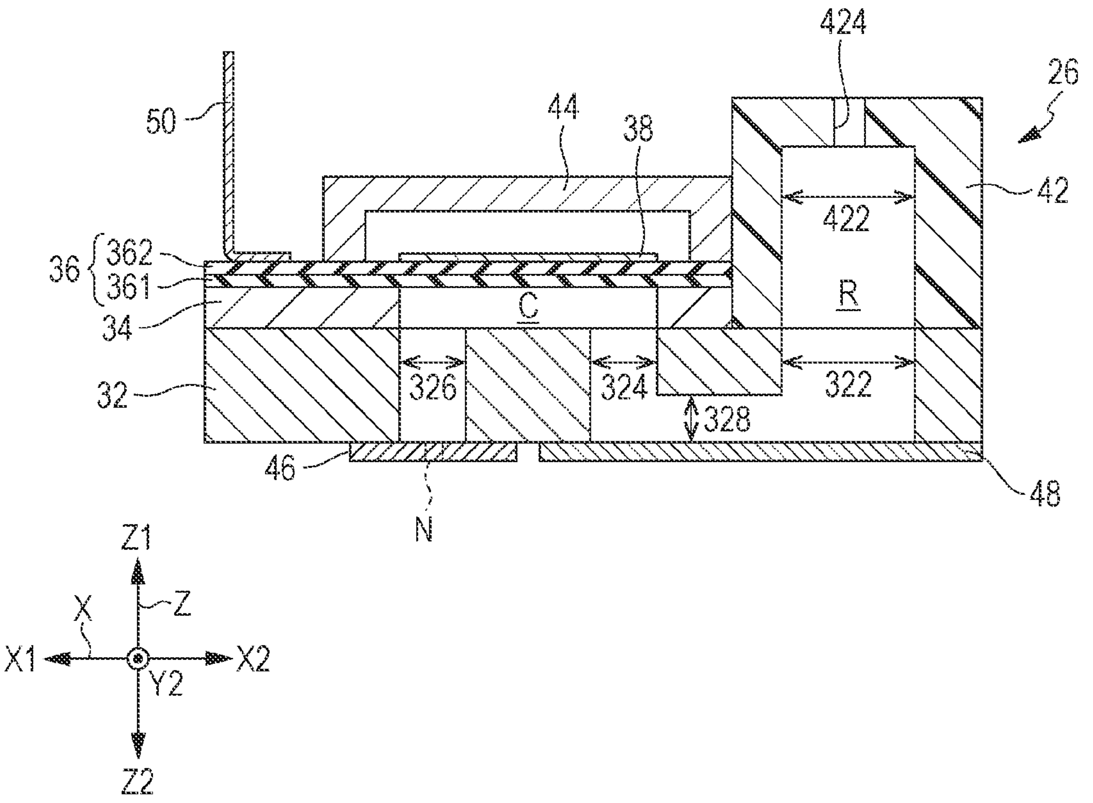
FIG. 3 is a cross-sectional view taken along the line III-III of FIG. 2.

FIG. 2 is an exploded perspective view of the liquid ejecting head 26 according to the first embodiment. FIG. 3 is a cross-sectional view taken along the line III-III of FIG. 2. As illustrated in FIGS. 2 and 3, the liquid ejecting head 26 includes a communication plate 32, a pressure compartment substrate 34, a diaphragm 36, a plurality of piezoelectric elements 38, a casing portion 42, an enclosure 44, a nozzle substrate 46, a dampener 48, and a wiring substrate 50.

Among them, the pressure compartment substrate 34, the diaphragm 36, the plurality of piezoelectric elements 38, the casing portion 42, and the enclosure 44 are disposed at positions located over the communication plate 32 in the Z1 direction. The nozzle substrate 46 and the dampener 48 are disposed at positions located under the communication plate 32 in the Z2 direction. Each of the components of the liquid ejecting head 26 is a rectangular plate-like member having its longer-side direction along the Y axis. These components of the liquid ejecting head 26 are bonded to one another by means of, for example, an adhesive.

As illustrated in FIG. 2, the nozzle substrate 46 is a plate-like member in which a plurality of nozzles N arranged in the direction along the Y axis is provided. Each of the nozzles N is a through hole through which ink is able to pass. The nozzle substrate 46 is manufactured by processing a monocrystalline silicon substrate by using a semiconductor manufacturing technique such as, for example, dry etching or wet etching, etc. However, any other known method and material may be used for manufacturing the nozzle substrate 46.

The communication plate 32 is a plate-like member for forming ink flow passages. As illustrated in FIGS. 2 and 3, an opening portion 322, a plurality of supply flow passages 324, a plurality of communication flow passages 326, and a relay flow passage 328 are formed in the communication plate 32. The opening portion 322 is an elongated through hole that extends in the direction along the Y axis in such a way as to be continuous throughout a plurality of pressure compartments C, which will be described layer, when viewed in plan in the direction along the Z axis. The supply flow passage 324 is a through hole that is provided individually for each of the plurality of pressure compartments C. The communication flow passage 326 is a through hole that is provided individually for each pair made up of two pressure compartments C. The relay flow passage 328 is provided in the Z2-directional surface of the communication plate 32 as illustrated in FIG. 3. The relay flow passage 328 is a flow passage which is provided throughout the plurality of supply flow passages 324 and via which the opening portion 322 is in communication with the plurality of supply flow passages 324. Similarly to the nozzle substrate 46 described earlier, the communication plate 32 is manufactured by, for example, processing a monocrystalline silicon substrate by using a semiconductor manufacturing technique. However, any other known method and material may be used for manufacturing the communication plate 32.

The pressure compartment substrate 34 is a plate-like member in which the plurality of pressure compartments C is formed. In the present embodiment, the plurality of pressure compartments C is provided such that a pair made up of two pressure compartments C corresponds to each one nozzle V. Each of the plurality of pressure compartments C is a space that is located between the communication plate 32 and the diaphragm 36 and is called as a cavity for applying pressure to ink with which the inside of this pressure compartment C is filled. The pressure compartments C are arranged in the direction along the Y axis. Each of the plurality of pressure compartments C is a hole having respective openings in both surfaces of the pressure compartment substrate 34. Each of the plurality of pressure compartments C has an elongated shape extending in the direction along the X axis. The X2-directional end of each of the plurality of pressure compartments C is in communication with the corresponding one of the plurality of supply flow passages 324. The X1-directional end of each of the plurality of pressure compartments C is in communication with the communication flow passage 326 that corresponds to the pair made up of two pressure compartments C including this one. Similarly to the nozzle substrate 46 described earlier, the pressure compartment substrate 34 is manufactured by, for example, processing a monocrystalline silicon substrate by using a semiconductor manufacturing technique. However, any other known method and material may be used for manufacturing the pressure compartment substrate 34, including each cavity thereof.

The diaphragm 36 is disposed on the Z1-directional surface of the pressure compartment substrate 34. The diaphragm 36 is a plate-like member that is elastically deformable. In the example illustrated in FIG. 3, the diaphragm 36 includes a first layer 361, which is an elastic film, and a second layer 362, which is an insulating film. The first layer 361 and the second layer 362 are stacked in this order in the Z1 direction. The first layer 361 is, for example, an elastic film made of silicon oxide ($SiO_2$). For example, the elastic film is formed by thermally oxidizing one surface of a monocrystalline silicon substrate. The second layer 362 is, for example, an insulating film made of zirconium oxide ($ZrO_2$). For example, the insulating film is formed by producing a zirconium layer by sputtering and next thermally oxidizing the zirconium layer.

The material of the first layer 361 is not limited to silicon oxide. The first layer 361 may be made of other elastic material, for example, silicon alone. The material of the second layer 362 is not limited to zirconium oxide. The second layer 362 may be made of other insulating material, for example, silicon nitride. Another layer such as a layer of metal oxide, etc. may be provided between the first layer 361 and the second layer 362. In other words, the first layer 361 or the second layer 362 may be comprised of a plurality of layers that are identical to each other or different from each other. A part or a whole of the diaphragm 36 may be formed integrally with the pressure compartment substrate 34 by using the same material. The diaphragm 36 may be configured as a layer of a single material.

The plurality of piezoelectric elements 38 corresponding to the nozzles N different from one another is provided on the Z1-directional surface of the diaphragm 36. In the present embodiment, the plurality of piezoelectric elements 38 is provided such that one piezoelectric element 38 corresponds to each pair made up of two pressure compartments C described above. Each of the plurality of piezoelectric elements 38 is a passive element that deforms by receiving supply of a drive signal. Each of the plurality of piezoelectric elements 38 has an elongated shape extending in the direction along the X axis. The piezoelectric elements 38 are arranged in the direction along the Y axis. The diaphragm 36 vibrates by being driven by the deformation of the piezoelectric element 38. The vibration causes a change in pressure inside the two pressure compartments C making up the pair corresponding to this piezoelectric element 38. Due to the change in pressure, ink is ejected from the nozzle N corresponding to this piezoelectric element 38. The plurality of piezoelectric elements 38 described above may be regarded as a single piezoelectric element 38 having a plurality of active regions corresponding to the plurality of piezoelectric elements 38 described above. The plurality of active regions includes a first active region AR_1 and a second active region AR_2 that will be described later. A detailed explanation of the piezoelectric element 38 will be given later in Section 1-3.

The casing portion 42 is a case for retaining ink that is to be supplied to the plurality of pressure compartments C. The casing portion 42 is bonded to the Z1-directional surface of the communication plate 32 by means of an adhesive, etc. The casing portion 42 is, for example, made of a resin material and is manufactured by injection molding. The casing portion 42 has a containing portion 422 and an inlet 424. The containing portion 422 is a recess having a shape corresponding to the shape of the opening portion 322 of the communication plate 32. The inlet 424 is a through hole that is in communication with the containing portion 422. The space formed by the opening portion 322 and the containing portion 422 serves as a liquid space R, which is a reservoir for retaining ink. Ink supplied from the liquid container 14 flows into the reservoir R via the inlet 424.

The dampener 48 is a component that absorbs changes in pressure inside the reservoir R. The dampener 48 is, for example, a compliance substrate that is a flexible sheet member that is elastically deformable. The dampener 48 is disposed on the Z2-directional surface of the communication plate 32 in such a way as to constitute the bottom of the reservoir R by closing the opening portion 322 of the communication plate 32, the relay flow passage 328 thereof, and the plurality of supply flow passages 324 thereof.

The enclosure 44 is a structural member that protects the plurality of piezoelectric elements 38 and enhances the mechanical strength of the pressure compartment substrate 34 and the diaphragm 36. The enclosure 44 is bonded to the surface of the diaphragm 36 by means of, for example, an adhesive. The enclosure 44 has a cavity for housing the plurality of piezoelectric elements 38.

The wiring substrate 50 is bonded to the Z1-directional surface of the pressure compartment substrate 34 or the diaphragm 36. The wiring substrate 50 is a component on which a plurality of wires for electric connection between the control unit 20 and the liquid ejecting head 26 is formed. The wiring substrate 50 is a flexible wiring board such as, for example, an FPC (Flexible Printed Circuit) or an FFC (Flexible Flat Cable). A drive signal for driving the piezoelectric element 38 flows through the wiring substrate 50. The drive signal is supplied to each of the plurality of piezoelectric elements 38 via the wiring substrate 50.

1-3. Correspondences Between Nozzle N, Pressure Compartment C, and Piezoelectric Element 38

Figure 4:
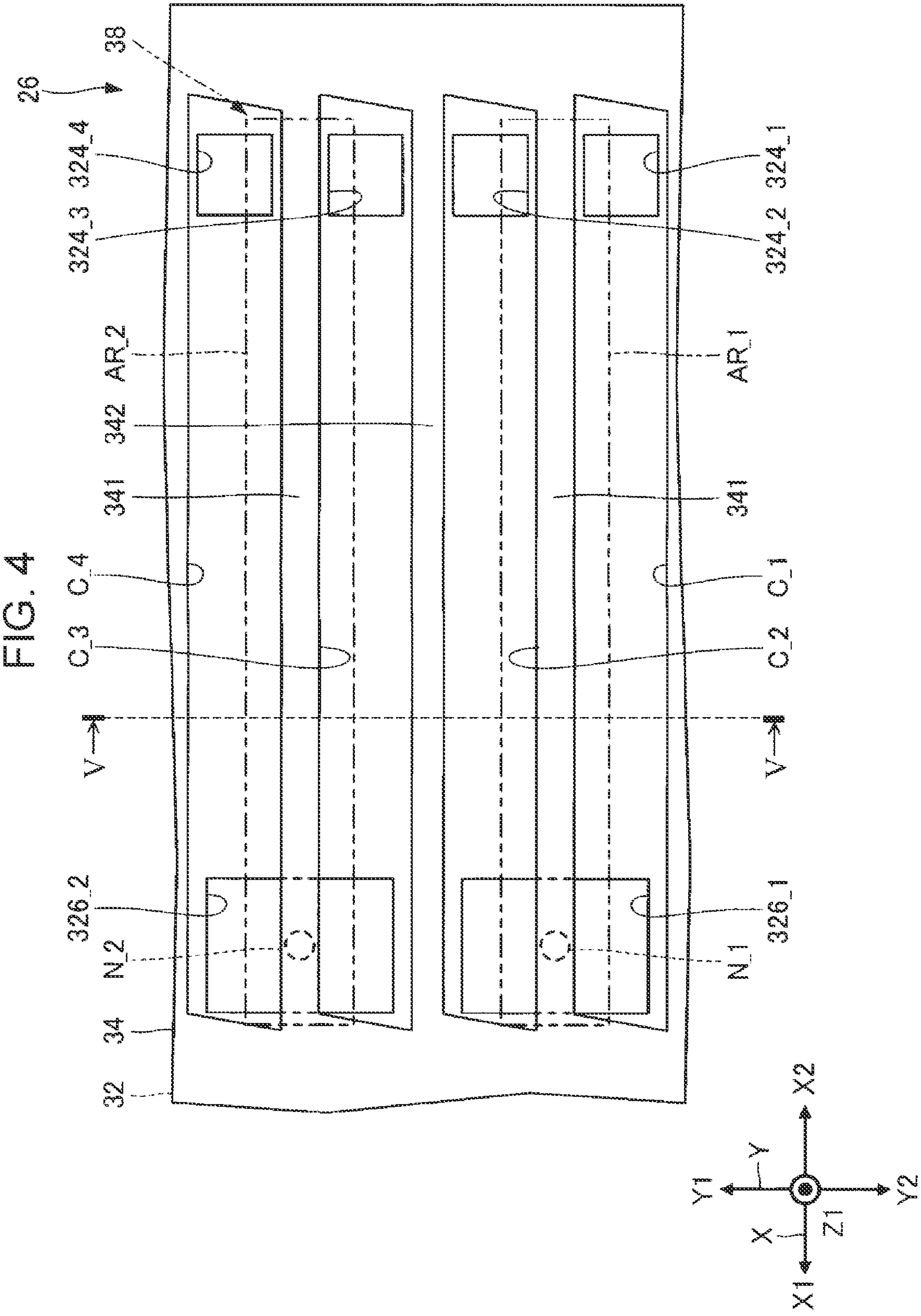
FIG. 4 is a plan view that illustrates correspondences between a nozzle, a pressure compartment, and a piezoelectric element.
Figure 5:
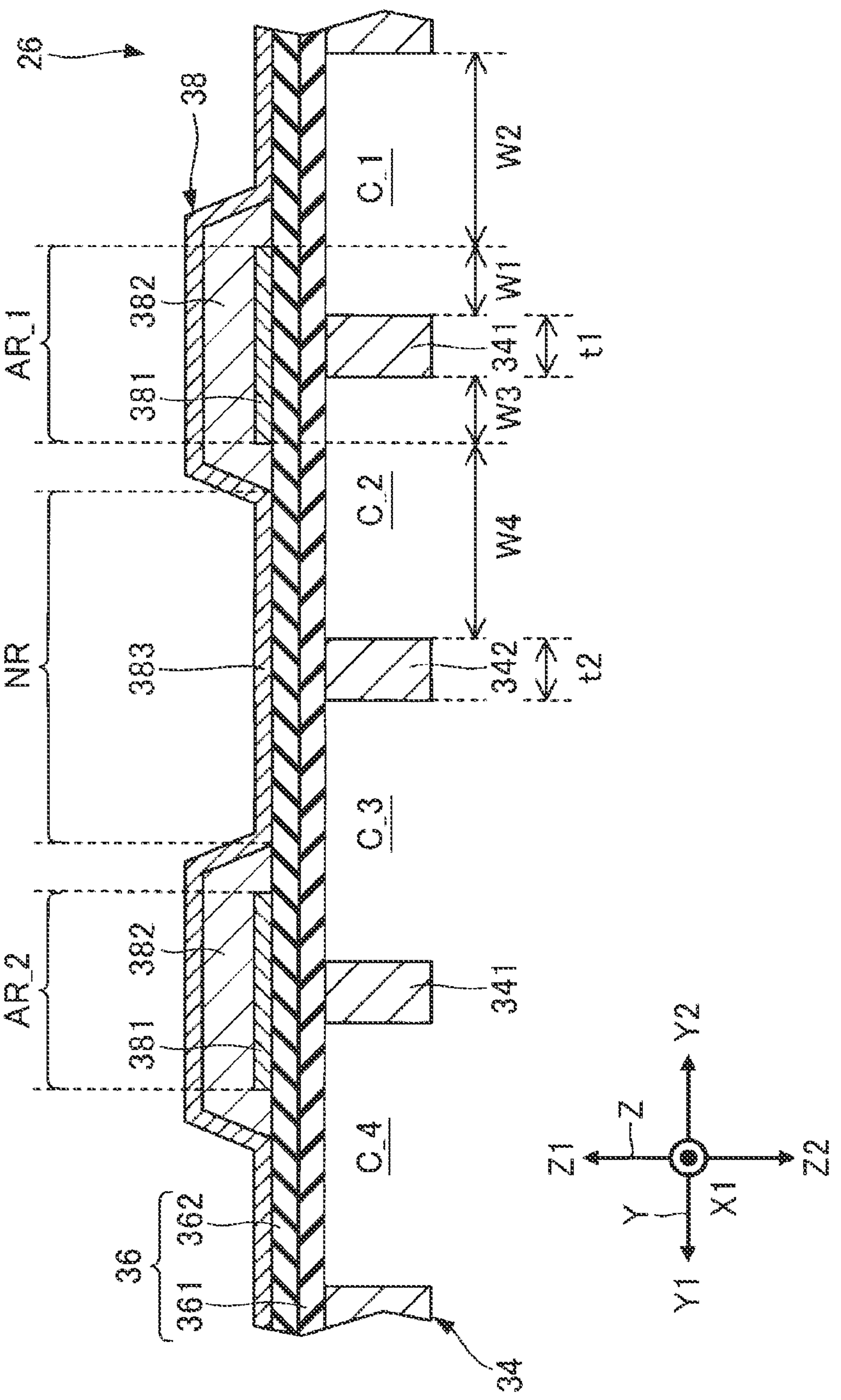
FIG. 5 is a cross-sectional view taken along the line V-V of FIG. 4.

FIG. 4 is a plan view that illustrates correspondences between the nozzle N, the pressure compartment C, and the piezoelectric element 38. FIG. 5 is a cross-sectional view taken along the line V-V of FIG. 4. With regard to the communication plate 32 and the pressure compartment substrate 34, FIGS. 4 and 5 depict a structure corresponding to arbitrarily-chosen two nozzles N located adjacent to each other among the plurality of nozzles N. The broken-line circles in FIG. 4 represent these two nozzles N. One of these two nozzles N is a first nozzle N_1. The other is a second nozzle N_2. The first nozzle N_1 and the second nozzle N_2 are arranged in this order in the Y1 direction.

As illustrated in FIG. 4, in the pressure compartment substrate 34, a first pressure compartment C_1 and a second pressure compartment C_2 are provided as two pressure compartments C corresponding to the first nozzle N_1, and a third pressure compartment C_3 and a fourth pressure compartment C_4 are provided as two pressure compartments C corresponding to the second nozzle N_2. The first pressure compartment C_1, the second pressure compartment C_2, the third pressure compartment C_3, and the fourth pressure compartment C_4 are arranged in this order in the Y1 direction. A first partition wall 341 is provided between the first pressure compartment C_1 and the second pressure compartment C_2. Another first partition wall 341 is provided between the third pressure compartment C_3 and the fourth pressure compartment C_4. A second partition wall 342 is provided between the second pressure compartment C_2 and the third pressure compartment C_3. In the description below, each of the pair made up of the first pressure compartment C_1 and the second pressure compartment C_2 and the pair made up of the third pressure compartment C_3 and the fourth pressure compartment C_4 may be referred to as "pair of pressure compartments C".

In the communication plate 32, a communication flow passage 326_1 is provided as the communication flow passage 326 corresponding to the pair made up of the first pressure compartment C_1 and the second pressure compartment C_2, and a communication flow passage 326_2 is provided as the communication flow passage 326 corresponding to the pair made up of the third pressure compartment C_3 and the fourth pressure compartment C_4. In addition, in the communication plate 32, a first supply passage 324_1, which is the supply flow passage 324 corresponding to the first pressure compartment C_1, a second supply passage 324_2, which is the supply flow passage 324 corresponding to the second pressure compartment C_3, a third supply passage 324_3, which is the supply flow passage 324 corresponding to the third pressure compartment C_3, and a fourth supply passage 324_4, which is the supply flow passage 324 corresponding to the fourth pressure compartment C_4, are provided.

As illustrated in FIG. 5, the piezoelectric element 38 includes a plurality of first electrodes 381, a piezoelectric body 382, and a second electrode 383. The first electrode 381, the piezoelectric body 382, and the second electrode 383 are stacked in this order in the Z1 direction. Another layer such as a layer for enhancing adhesion, etc. may be provided between one layer and another layer of the piezoelectric element 38, and/or between the piezoelectric element 38 and the diaphragm 36. A seed layer may be provided between the first electrode 381 and the piezoelectric body 382. The seed layer has a function of enhancing the orientation property of the piezoelectric body 382 when the piezoelectric body 382 is formed. The seed layer is made of, for example, titanium (Ti). Alternatively, the seed layer may be made of a material that has a perovskite structure such as $Pb(Fe,Ti)O_3$, etc.

The first electrode 381 is an individual electrode disposed for each pair of pressure compartments C such that these individual electrodes are arranged at a distance from one another. Specifically, the plural first electrodes 381, each of which extends in the direction along the X axis, are arranged in the direction along the Y axis such that they are spaced from one another. To each of the plurality of first electrodes 381, a drive signal for ejecting ink from the nozzle N corresponding to this pair of pressure compartments C is applied via the wiring substrate 50.

The first electrode 381 includes, for example, a first layer made of titanium (Ti), a second layer made of platinum (Pt), and a third layer made of iridium (Ir). The first, second, and third layers are stacked in this order in the Z1 direction. The first electrode 381 is formed using, for example, a known film deposition technique such as sputtering and a known processing technique using photolithography and etching, etc.

The first layer mentioned above serves as an adhesion layer for enhancing the adhesion of the first electrode 381 to the diaphragm 36. The thickness of the first layer is not specifically limited. For example, the first layer has a thickness of 3 nm or greater and 50 nm or less approximately. The material of the first layer is not limited to titanium. For example, chromium may be used as the material of the first layer in place of titanium.

Both of metal of the second layer mentioned above and metal of the third layer mentioned above are electrode materials having excellent electric conductivity. In addition, the chemical properties of them are close to each other. Therefore, it is possible to make the electrode characteristics of the first electrode 381 excellent. The thickness of the second layer is not specifically limited. For example, the second layer has a thickness of 50 nm or greater and 200 nm or less approximately. The thickness of the third layer is not specifically limited. For example, the third layer has a thickness of 4 nm or greater and 20 nm or less approximately.

The structure of the first electrode 381 is not limited to the above example. For example, either one of the second layer and the third layer mentioned above may be omitted. A layer made of iridium may be further provided between the first layer and the second layer mentioned above. A layer made of an electrode material other than iridium and platinum may be used in place of the second layer and the third layer or in addition to the second layer and the third layer. An example of such an electrode material is metal such as aluminum (Al), nickel (Ni), gold (Au), copper (Cu), etc. Any one of these kinds of the material may be used alone, or any two or more of these kinds of the material may be used in combination in the form of stacked layers, alloy, or the like.

The piezoelectric body 382 is disposed between the plurality of first electrodes 381 and the second electrode 383. Although the piezoelectric body 382 may be provided individually for each of the first pressure compartment C_1, the second pressure compartment C_2, the third pressure compartment C_3, and the fourth pressure compartment C_4, the piezoelectric body 382 could have a band shape extending in the direction along the Y axis in such a way as to be continuous throughout these pressure compartments C. In this case, in the piezoelectric body 382, a through hole extending in the direction along the X axis is formed through the piezoelectric body 382 at each area corresponding in plan view to a gap between two pairs of pressure compartments C located next to each other.

The piezoelectric body 382 is made of a piezoelectric material that has a perovskite-type crystal structure that is represented by a general composition formula $ABO_3$. Examples of such a piezoelectric material include, for example, lead titanate ($PbTiO_3$), lead zirconate titanate ($Pb(Zr,Ti)O_3$), lead zirconate ($PbZrO_3$), lead lanthanum titanate ($(Pb,La),TiO_3$), lead lanthanum zirconate titanate ((Pb,La)(Zr, Ti)$O_3$), lead niobate zirconate titanate (Pb(Zr, Ti,Nb)$O_3$), lead magnesium niobate zirconate titanate (Pb (Zr,Ti) (Mg,Nb)$O_3$), and the like. Among them, lead zirconate titanate is a preferred example that can be used as the material of the piezoelectric body 382. The piezoelectric body 382 may contain a small amount of another element such as impurity. The piezoelectric material of the piezoelectric body 382 may be a lead-free material such as barium titanate, etc.

The piezoelectric body 382 is formed by producing a piezoelectric precursor layer using, for example, a liquid-phase method such as a sol-gel method or an MOD (metal organic decomposition) method, etc. and then by sintering the precursor layer for crystallization. Although the piezoelectric body 382 may be configured as a single-layer body, it is advantageous to configure the piezoelectric body 382 as a multiple-layer body. The reason is that this will make it easier to keep the characteristics of the piezoelectric body 382 high even when the thickness of the piezoelectric body 382 is increased.

The second electrode 442 is a band-shaped common electrode extending in the direction along the Y axis continuously throughout the first pressure compartment C_1, the second pressure compartment C_2, the third pressure compartment C_3, and the fourth pressure compartment C_4. A predetermined reference voltage is applied to the second electrode 383.

The second electrode 383 includes, for example, a layer made of iridium (Ir) and a layer made of titanium (Ti). These layers are stacked in this order in the Z1 direction. The second electrode 383 is formed using, for example, a known film deposition technique such as sputtering and a known processing technique using photolithography and etching, etc.

The material of the second electrode 383 is not limited to iridium and titanium. For example, the second electrode 383 may be made of metal such as platinum (Pt), aluminum (Al), nickel (Ni), gold (Au), or copper (Cu), etc. The second electrode 383 may be formed using any one of these kinds of the metal material alone, or using any two or more of these kinds of the metal material in combination in the form of stacked layers, alloy, or the like. The second electrode 383 may be configured as a single layer. However, preferably, iridium, or iridium oxide with less oxygen content than a stoichiometric composition, may be used as the material of the second electrode 383.

The piezoelectric element 38 having the layer structure described above includes the first active region AR_1 and the second active region AR_2. The first active region AR_1 and the second active region AR_2 are arranged in this order in the Y1 direction.

As illustrated in FIG. 5, the first active region AR_1 is a region of the piezoelectric element 38 where the piezoelectric body 382 is sandwiched between a first electrode 381 (first individual electrode), that is, one of the plurality of first electrodes 381, and the second electrode 383. The first active region AR_1 corresponds to the first nozzle N_1. As illustrated in FIG. 4, in plan view, the first active region AR_1 is located to span from the first pressure compartment C_1 to the second pressure compartment C_2. Therefore, it is possible to cause the displacement of the piezoelectric body 382 in the first active region AR_1 by means of an electric field applied between this one first electrode 381 and the second electrode 383. Therefore, it is possible to eject ink from the first nozzle N_1 by pressurizing both of the first pressure compartment C_1 and the second pressure compartment C_2 simultaneously by driving the first active region AR_1.

The first active region AR_1 has a portion protruding in the Y1 direction beyond the first partition wall 341 and a portion protruding in the Y2 direction beyond the first partition wall 341. In the example illustrated in FIG. 5, the length of this portion along the Y axis is less than the length of the first pressure compartment C_1 or the second pressure compartment C_2 along the Y axis.

Therefore, the width W1, in the Y1 direction, of the overlapping part of the first pressure compartment C_1 that overlaps with the first active region AR_1 as viewed in the Z1 direction is less than the width W2, in the Y1 direction, of the non-overlapping part of the first pressure compartment C_1 that does not overlap with the first active region AR_1 as viewed in the Z1 direction. Similarly, the width W3, in the Y1 direction, of the overlapping part of the second pressure compartment C_2 that overlaps with the first active region AR_1 as viewed in the Z1 direction is less than the width W4, in the Y1 direction, of the non-overlapping part of the second pressure compartment C_2 that does not overlap with the first active region AR_1 as viewed in the Z1 direction.

As illustrated in FIG. 5, the second active region AR_2 is a region of the piezoelectric element 38 where the piezoelectric body 382 is sandwiched between another one first electrode 381 (second individual electrode), among the plurality of first electrodes 381, and the second electrode 383. The second active region AR_2 corresponds to the second nozzle N_2. As illustrated in FIG. 4, in plan view, the second active region AR_2 is located to span from the third pressure compartment C_3 to the fourth pressure compartment C_4. Therefore, it is possible to cause the displacement of the piezoelectric body 382 in the second active region AR_2 by means of an electric field applied between this another one first electrode 381 and the second electrode 383. Therefore, it is possible to eject ink from the second nozzle N_2 by pressurizing both of the third pressure compartment C_3 and the fourth pressure compartment C_4 simultaneously by driving the second active region AR_2. The second active region AR_2 has a portion protruding in the Y1 direction beyond the first partition wall 341 and a portion protruding in the Y2 direction beyond the first partition wall 341, likewise the first active region AR_1 described above.

In the present embodiment, a region NR where the piezoelectric body 382 is absent exists between the first active region AR_1 and the second active region AR_2. In the example illustrated in FIG. 5, the region NR is comprised of the second electrode 383 only. The region NR may include, besides the second electrode 383, a layer made of the same material as that of the first electrode 381.

The liquid ejecting head 26 according to the above embodiment includes the nozzle substrate 46, the pressure compartment substrate 34, the diaphragm 36, and the piezoelectric elements 38 as described earlier. These components are stacked in this order in the Z1 direction, which is an example of "a second direction intersecting with the first direction". In the nozzle substrate 46, the plurality of nozzles N arranged in the Y1 direction or the Y2 direction, which constitute an example of the "first direction", is provided. The plurality of pressure compartments C arranged in the Y1 direction or the Y2 direction is provided in the pressure compartment substrate 34. The piezoelectric element(s) 38 includes the second electrode 383, which is an example of "a common electrode" provided in common to the plurality of pressure compartments C, the plurality of first electrodes 381, which is an example of "a plurality of individual electrodes" provided individually for the plurality of pressure compartments C, and the piezoelectric body 382 sandwiched between the first electrodes 381 and the second electrode 383.

As described earlier, the plurality of pressure compartments C includes the first pressure compartment C_1 and the second pressure compartment C_2 located next to the first pressure compartment C_1 in the Y1 direction. The plurality of nozzles N includes the first nozzle N_1 that is in communication with the first pressure compartment C_1 and the second pressure compartment C_2 in a shared manner. The piezoelectric element 38 includes the first active region AR_1 where the piezoelectric body 382 is sandwiched between the first electrode 381 that is an example of "a first individual electrode", among the plurality of first electrodes 381, and the second electrode 383.

The first active region AR_1 is located to span from at least a part of the first pressure compartment C_1 to at least a part of the second pressure compartment C_2 as viewed in the Z1 direction. Therefore, it is possible to eject the liquid from the first nozzle N_1 by changing the pressure inside the first pressure compartment C_1 and the second pressure compartment C_2 by the operation of the first active region AR_1. Moreover, because of the above layout of the first active region AR_1, as compared with a structure in which separate active regions of the piezoelectric element 38 corresponding respectively to the first pressure compartment C_1 and the second pressure compartment C_2 are provided, it is possible to make an active-region-to-active-region pitch wider, thereby reducing changes in characteristics, caused due to the manufacturing error of the piezoelectric element 38, of ejecting the liquid from the first nozzle N_1. Furthermore, for example, even if the first active region AR_1 is shifted off the center in the Y1 direction or the Y2 direction, at least a part of pressure fluctuations in the first pressure compartment C_1 caused by the manufacturing error and a part of pressure fluctuations in the second pressure compartment C_2 caused by the manufacturing error offset each other, resulting in a reduction in changes in characteristics of ejecting the liquid from the first nozzle N_1.

As described earlier, the plurality of pressure compartments C further includes the third pressure compartment C_3 located next to the second pressure compartment C_2 in the Y1 direction. The plurality of nozzles N includes the second nozzle N_2 located next to the first nozzle N_1 in the Y1 direction. The second nozzle N_2 is neither in communication with the first pressure compartment C_1 nor in communication with the second pressure compartment C_2. The second nozzle N_2 is in communication with the third pressure compartment C_3. The first active region AR_1 does not span to the third pressure compartment C_3 as viewed in the Z1 direction. This prevents pressure fluctuations in the third pressure compartment C_3 from being caused by the operation of the first active region AR_1.

As described earlier, the plurality of pressure compartments C further includes the fourth pressure compartment C_4 located next to the third pressure compartment C_3 in the Y1 direction. The second nozzle N_2 is in communication with the third pressure compartment C_3 and the fourth pressure compartment C_4 in a shared manner. The piezoelectric element 38 includes the second active region AR_2 where the piezoelectric body 382 is sandwiched between the first electrode 381 that is an example of "a second individual electrode", among the plurality of first electrodes 381, and the second electrode 383. The second active region AR_2 is located to span from at least a part of the third pressure compartment C_3 to at least a part of the fourth pressure compartment C_4. Therefore, as compared with a structure in which active regions corresponding respectively to the third pressure compartment C_3 and the fourth pressure compartment C_4 are provided, it is possible to reduce changes in characteristics, caused due to the manufacturing error of the piezoelectric element 38, of ejecting the liquid from the second nozzle N_2.

In the present embodiment, as described earlier, no other piezoelectric body 382 is provided between the piezoelectric body 382 in the first active region AR_1 and the piezoelectric body 382 in the second active region AR_2 in the Y1 direction. Therefore, it is possible to reduce constraints on the diaphragm 36 by the piezoelectric body 382. Consequently, it is possible to increase the drive efficiency of the liquid ejecting head 26.

As described earlier, the width W1, in the Y1 direction, of the overlapping part of the first pressure compartment C_1 that overlaps with the first active region AR_1 as viewed in the Z1 direction is less than the width W2, in the Y1 direction, of the non-overlapping part of the first pressure compartment C_1 that does not overlap with the first active region AR_1 as viewed in the Z1 direction. Similarly, the width W3, in the Y1 direction, of the overlapping part of the second pressure compartment C_2 that overlaps with the first active region AR_1 as viewed in the Z1 direction is less than the width W4, in the Y1 direction, of the non-overlapping part of the second pressure compartment C_2 that does not overlap with the first active region AR_1 as viewed in the Z1 direction. Because of this relationships between the widths W1 to W4, as compared with a structure having the opposite relationships between these widths, it is possible to reduce changes in characteristics, caused due to the manufacturing error of the first active region AR_1, of ejecting the liquid from the first nozzle N_1.

The width W1 may be greater than the width W2, and the width W3 may be greater than the width W4. This structure is advantageous over a structure having the opposite relationships between these widths in that it is easier to increase the drive efficiency of the first active region AR_1.

Although the structure explained in the foregoing description has the communication flow passage 326 that is a shared communication flow passage that is in communication with both of the first pressure compartment C_1 and the second pressure compartment C_2, the disclosed concept may be embodied in other modes. The disclosed apparatus may have a structure that includes a first nozzle flow passage that is in communication with the first nozzle N_1, a first communication passage for communication between the first pressure compartment C_1 and the first nozzle flow passage, and a second communication passage for communication between the second pressure compartment C_2 and the first nozzle flow passage. That is, the disclosed apparatus may have individual communication passages for communicating with the first pressure compartment C_1 and with the second pressure compartment C_2 respectively.

As described earlier, the plurality of flow passages further includes the first supply passage 324_1, through which the liquid is supplied to the first pressure compartment C_1, and the second supply passage 324_2, through which the liquid is supplied to the second pressure compartment C_2. Therefore, as compared with a structure in which either one of the first supply passage and the second supply passage is omitted, it is possible to supply the liquid to both of the first pressure compartment and the second pressure compartment more smoothly. Another advantage is that it is easier to reduce the size of the liquid ejecting head 26 because of simpler liquid flow passages as compared with a structure that entails liquid circulation as in a fourth modification example described later.

As described earlier, the plurality of first electrodes 381 is disposed between the piezoelectric body 382 and the diaphragm 36. Therefore, as compared with a structure in which the common electrode is disposed between the piezoelectric body 382 and the diaphragm 36, it is easier to form wiring for the individual electrodes.

As described earlier, in the liquid ejecting head 26, both of the first pressure compartment C_1 and the second pressure compartment C_2 have positive pressure. Therefore, as compared with a structure in which the liquid is ejected from the first nozzle N_1 by using the pressure of the first pressure compartment C_1 only, it is possible to eject the liquid from the first nozzle N_1 more efficiently.

2. Second Embodiment

A second embodiment of the present disclosure will now be explained. In the exemplary embodiment described below, the same reference numerals as those used in the description of the first embodiment are assigned to elements that are the same in operation and/or function as those in the first embodiment, and a detailed explanation of them is omitted.

Figure 6:
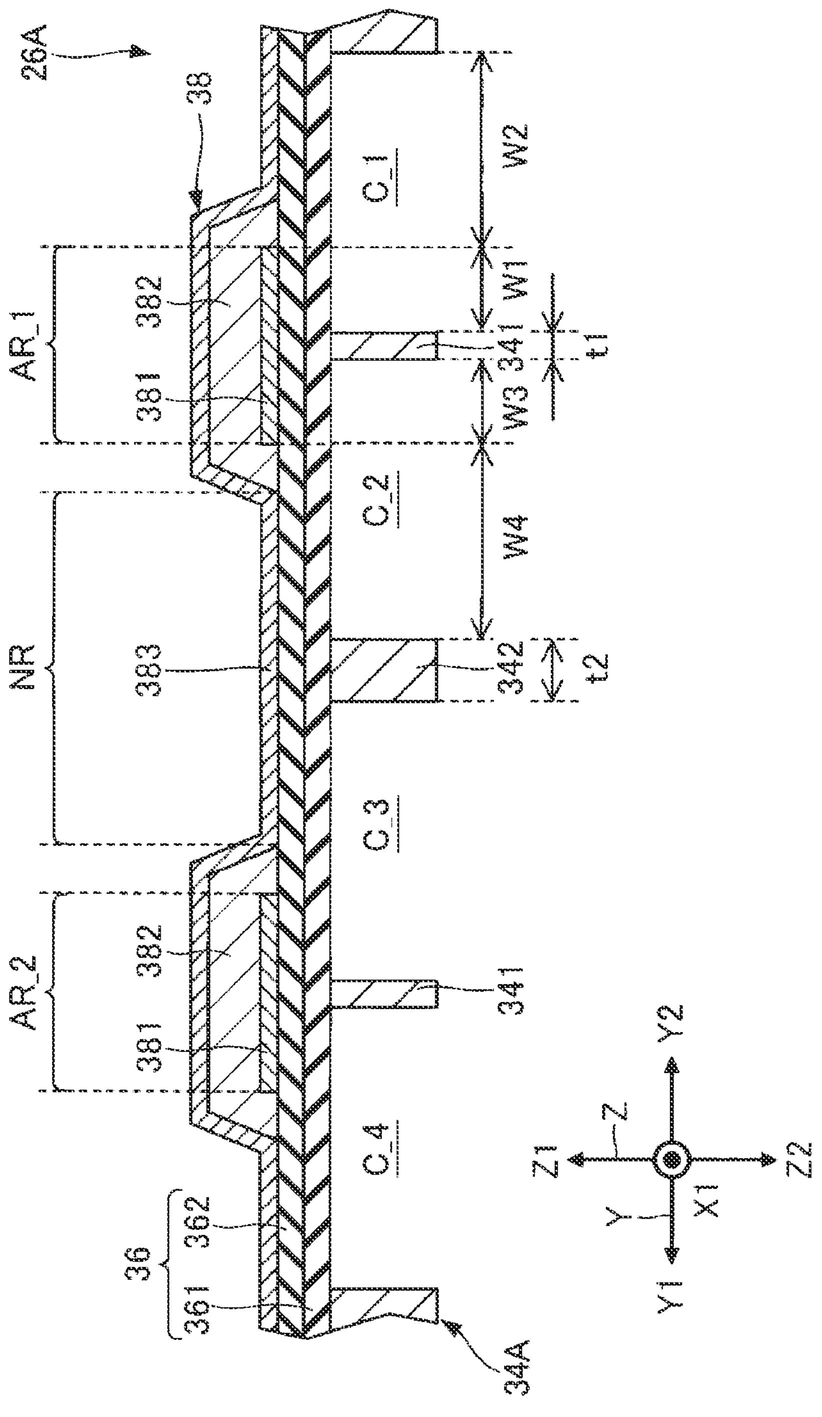
FIG. 6 is a cross-sectional view of a part of a liquid ejecting head according to a second embodiment.

FIG. 6 is a cross-sectional view of a part of a liquid ejecting head 26A according to a second embodiment. The liquid ejecting head 26A is the same as the liquid ejecting head 26 according to the first embodiment described earlier except that the liquid ejecting head 26A includes a pressure compartment substrate 34A in place of the pressure compartment substrate 34. The pressure compartment substrate 34A is the same as the pressure compartment substrate 34 except that the thickness t1 of the first partition wall 341 is different from that of the foregoing embodiment.

The pressure compartment substrate 34A includes the first partition wall 341 for partitioning between the first pressure compartment C_1 and the second pressure compartment C_2 and the second partition wall 342 for partitioning between the second pressure compartment C_2 and the third pressure compartment C_3. The thickness t1 of the first partition wall 341 in the Y1 direction is less than the thickness t2 of the second partition wall 342 in the Y1 direction. Therefore, as compared with a structure in which the thickness t1 of the first partition wall 341 is not less than the thickness t2 of the second partition wall 342, it is possible to make the drive efficiency of the first active region AR_1 higher.

The second embodiment described above also makes it possible to reduce deviation in ejection characteristics due to a manufacturing error.

3. Third Embodiment

A third embodiment of the present disclosure will now be explained. In the exemplary embodiment described below, the same reference numerals as those used in the description of the first embodiment are assigned to elements that are the same in operation and/or function as those in the first embodiment, and a detailed explanation of them is omitted.

Figure 7:
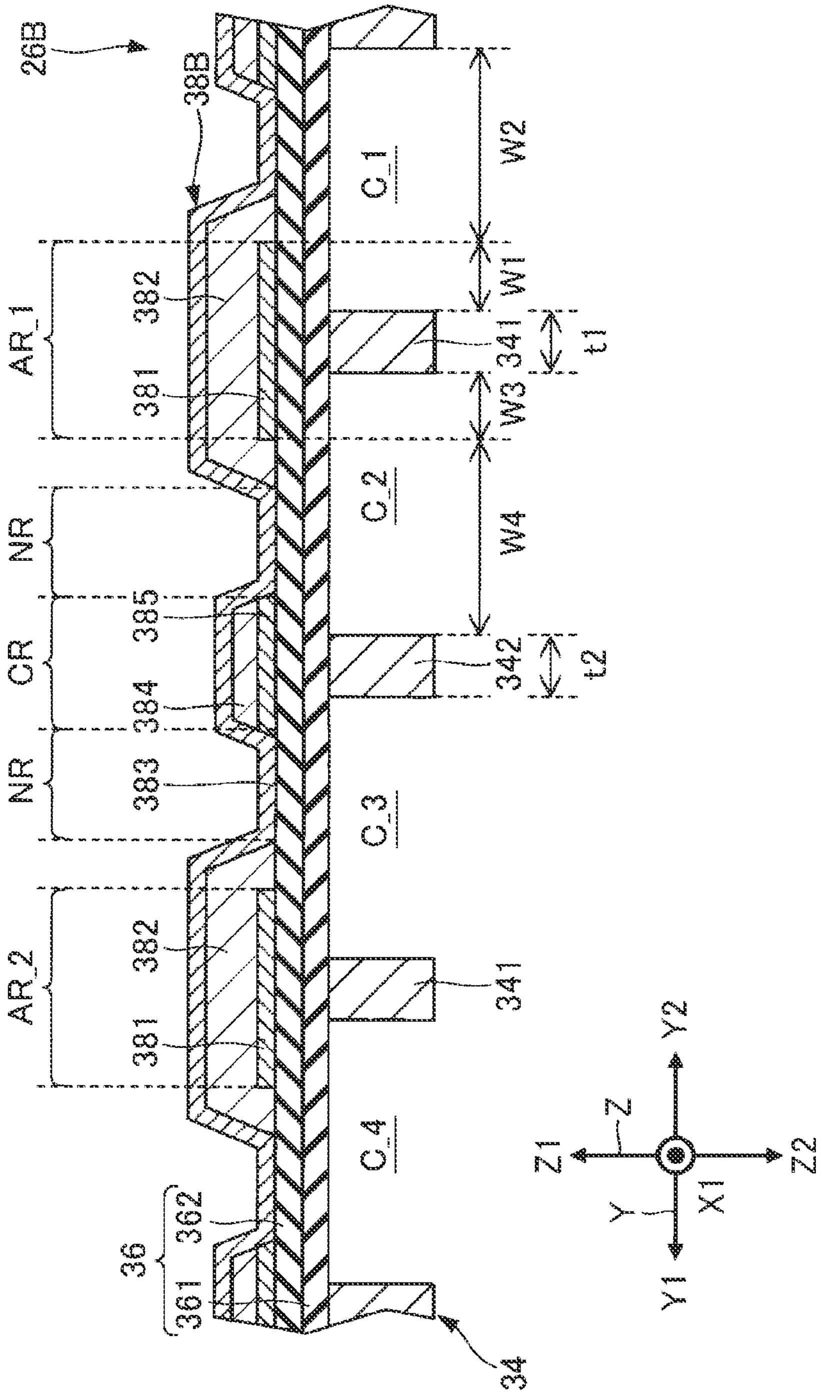
FIG. 7 is a cross-sectional view of a part of a liquid ejecting head according to a third embodiment.

FIG. 7 is a cross-sectional view of a part of a liquid ejecting head 26B according to a third embodiment. The liquid ejecting head 26B is the same as the liquid ejecting head 26 according to the first embodiment described earlier except that the liquid ejecting head 26B includes a piezoelectric element 38B in place of the piezoelectric element 38. Except for the structure of the piezoelectric body 382, the piezoelectric element 38B is the same as the piezoelectric element 38.

The piezoelectric element 38B includes a mid region CR where other piezoelectric body 382 is provided between the piezoelectric body 382 in the first active region AR_1 and the piezoelectric body 382 in the second active region AR_2 in the Y1 direction. The piezoelectric body 382 in the mid region CR is continuous to neither of the piezoelectric body 382 in the first active region AR_1 and the piezoelectric body 382 in the second active region AR_2. Therefore, it is possible to reinforce, with the mid region CR, a connection portion where the second partition wall 342 for partitioning between the second pressure compartment C_2 and the third pressure compartment C_3 is connected to the diaphragm 36. Consequently, it is possible to reduce damage to the diaphragm 36.

The mid region CR includes a conductor portion 385 made of the same material as that of the first electrode 381 at a position where the piezoelectric body 382 is sandwiched between the second electrode 383 and the conductor portion 385. Therefore, it is possible to make the rigidity of the mid region CR higher as compared with a structure in which the conductor portion 385 is omitted. The higher rigidity makes it easier to reduce damage to the diaphragm 36. The conductor portion 385 is electrically coupled to the second electrode 383. Because of this electric connection, the potential of the conductor portion 385 is the same as that of the second electrode 383. Therefore, no electric field is applied to a portion 384. The lack of field application reduces the deformation of the mid region CR due to the driving of the first active region AR_1. Consequently, the mid region CR provides good reinforcement to the connection portion mentioned above.

The conductor portion 385 mentioned above may be omitted. That is, the mid region CR does not necessarily have to include a portion made of the same material as that of the first electrode 381 at a position where the piezoelectric body 382 is sandwiched between the second electrode 383 and this same-material portion. Even without this same-material portion, no electric field is applied to a portion 384 and, therefore, the deformation of the mid region CR due to the driving of the first active region AR_1 is reduced. Consequently, the mid region CR provides good reinforcement to the connection portion mentioned above.

The third embodiment described above also makes it possible to reduce deviation in ejection characteristics due to a manufacturing error.

4. Fourth Embodiment

A fourth embodiment of the present disclosure will now be explained. In the exemplary embodiment described below, the same reference numerals as those used in the description of the first embodiment are assigned to elements that are the same in operation and/or function as those in the first embodiment, and a detailed explanation of them is omitted.

Figure 8:
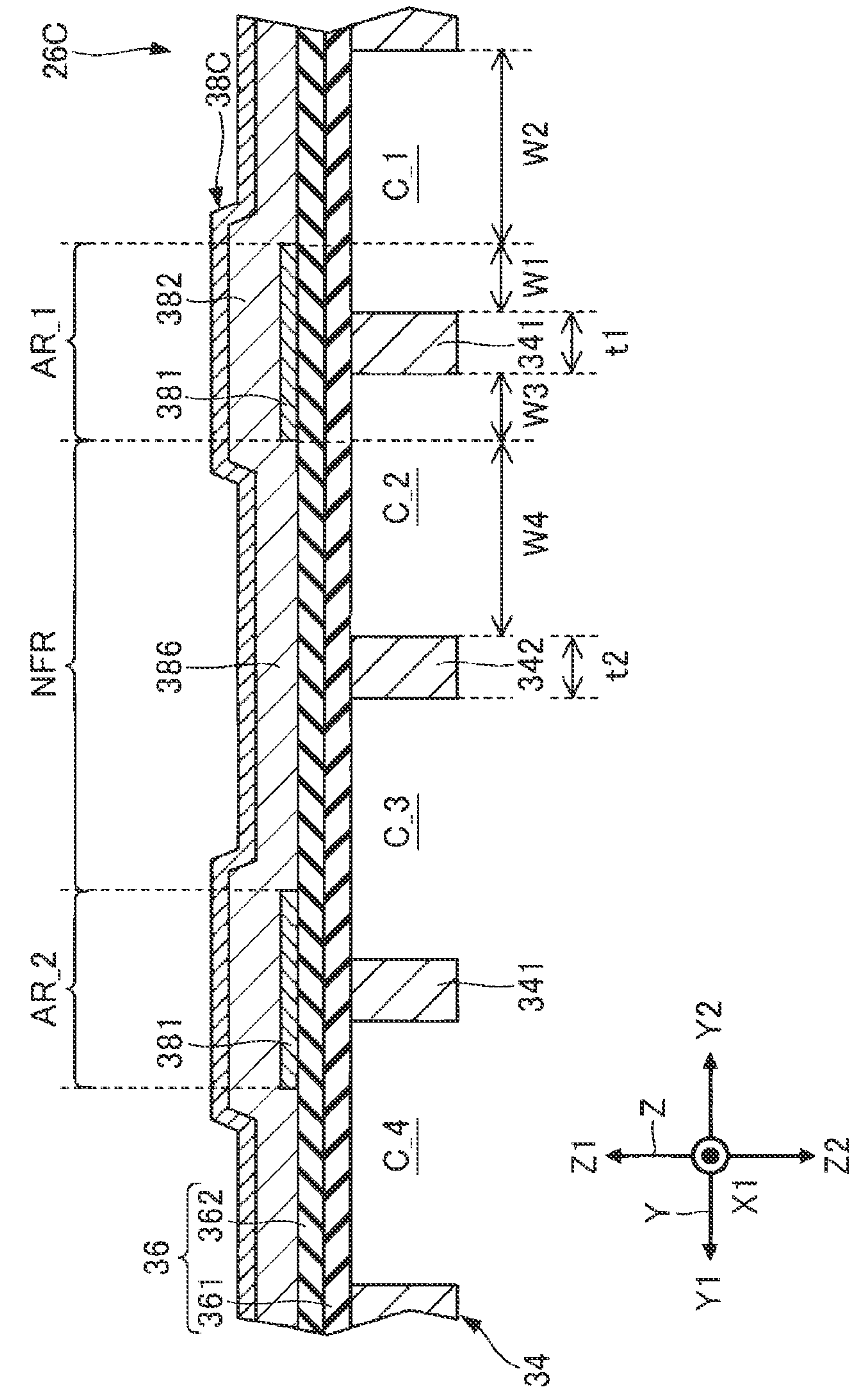
FIG. 8 is a cross-sectional view of a part of a liquid ejecting head according to a fourth embodiment.

FIG. 8 is a cross-sectional view of a part of a liquid ejecting head 26C according to a fourth embodiment. The liquid ejecting head 26C is the same as the liquid ejecting head 26 according to the first embodiment described earlier except that the liquid ejecting head 26C includes a piezoelectric element 38C in place of the piezoelectric element 38. Except for the structure of the piezoelectric body 382, the piezoelectric element 38C is the same as the piezoelectric element 38.

The piezoelectric element 38C includes a non-active region NFR located between the first active region AR_1 and the second active region AR_2 in the Y1 direction. The piezoelectric body 382 includes a portion 386 provided in the non-active region NFR in such a way as to be continuous to the first active region AR_1 and the second active region AR_2. The plurality of first electrodes 381 is not provided in the non-active region NFR. Since the non-active region NFR described above is provided, even if the piezoelectric body 382 is shifted in the Y1 direction or the Y2 direction, it is possible to reduce changes in characteristics of ejecting the liquid from the first nozzle N_1. Another advantage is that the processing of the piezoelectric body 382 is simpler as compared with a structure that includes a region where the piezoelectric body 382 is not provided between the first active region AR_1 and the second active region AR_2.

The fourth embodiment described above also makes it possible to reduce deviation in ejection characteristics due to a manufacturing error.

5. Modification Example

The embodiments described as examples above can be modified in various ways. Some specific examples of modification that can be applied to the embodiments described above are described below. Two or more modification examples selected arbitrarily from the description below may be combined as long as they are not contradictory to each other or one another. In the modification examples described below, the same reference numerals as those used in the description of the first embodiment are assigned to elements that are the same in operation and/or function as those in the first embodiment, and a detailed explanation of them is omitted.

5-1. First Modification Example

Figure 9:
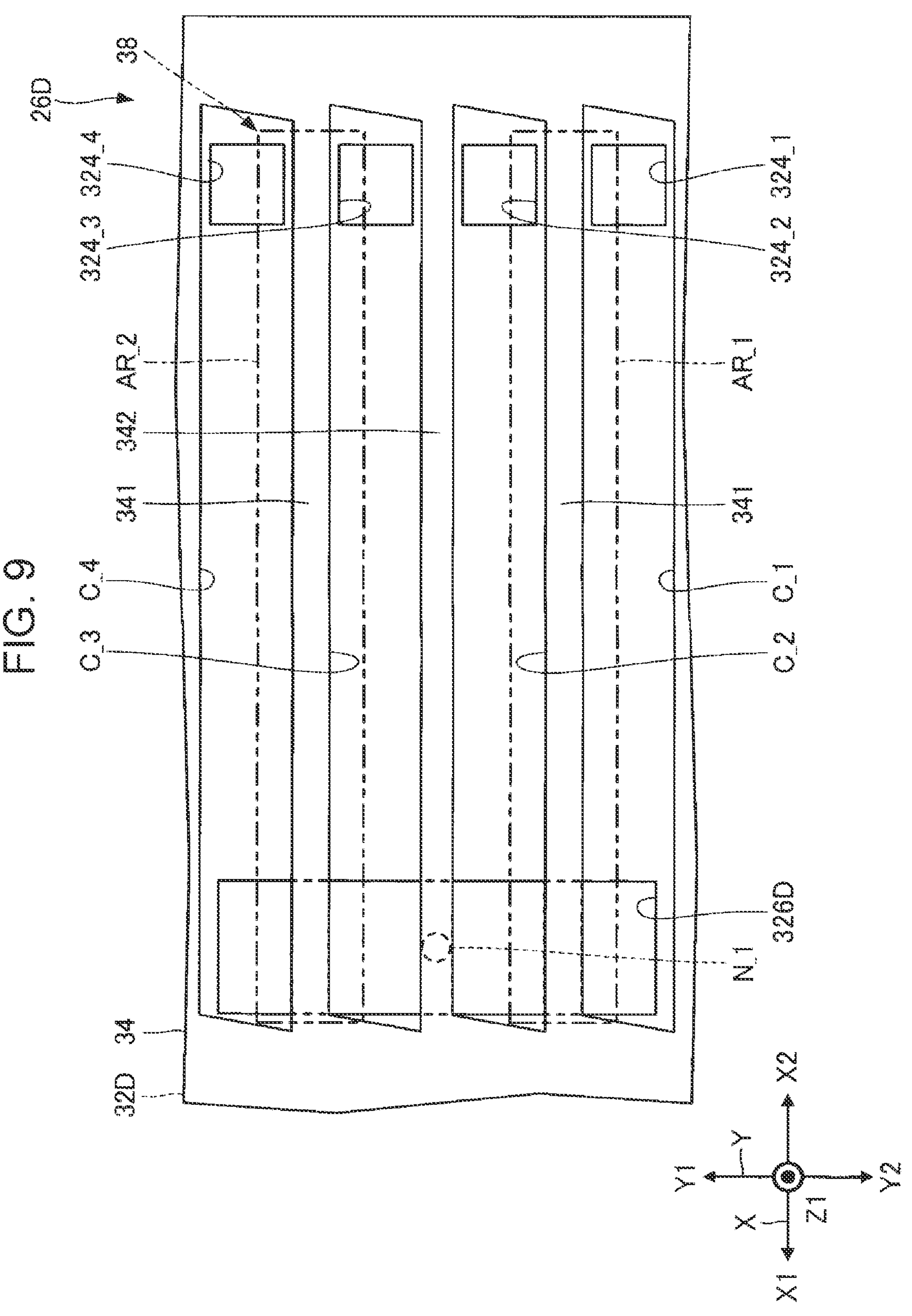
FIG. 9 is a plan view that illustrates correspondences between a nozzle, a pressure compartment, and a piezoelectric element of a liquid ejecting head according to a first modification example.

FIG. 9 is a plan view that illustrates correspondences between the nozzle N, the pressure compartment C, and the piezoelectric element 38 of a liquid ejecting head 26D according to a first modification example. The liquid ejecting head 26D is the same as the liquid ejecting head 26 according to the first embodiment described earlier except that the second nozzle N_2 is omitted and that the liquid ejecting head 26D includes a communication plate 32D in place of the communication plate 32. The communication plate 32D is the same as that the communication plate 32 except that the communication plate 32D includes a communication flow passage 326D in place of the communication flow passage 326_1 and the communication flow passage 326_2.

In the first modification example, the first pressure compartment C_1, the second pressure compartment C_2, the third pressure compartment C_3, and the fourth pressure compartment C_4 are put into a group corresponding to the first nozzle N_1, and the communication flow passage 326D is provided for the group. That is, the communication flow passage 326D corresponds to the first nozzle N_1 and is in communication with each of the first pressure compartment C_1, the second pressure compartment C_2, the third pressure compartment C_3, and the fourth pressure compartment C_4. The first modification example described above also makes it possible to reduce deviation in ejection characteristics due to a manufacturing error. Moreover, in the first modification example, it is possible to obtain greater ejection pressure than each of the foregoing embodiments.

5-2. Second Modification Example

Figure 10:
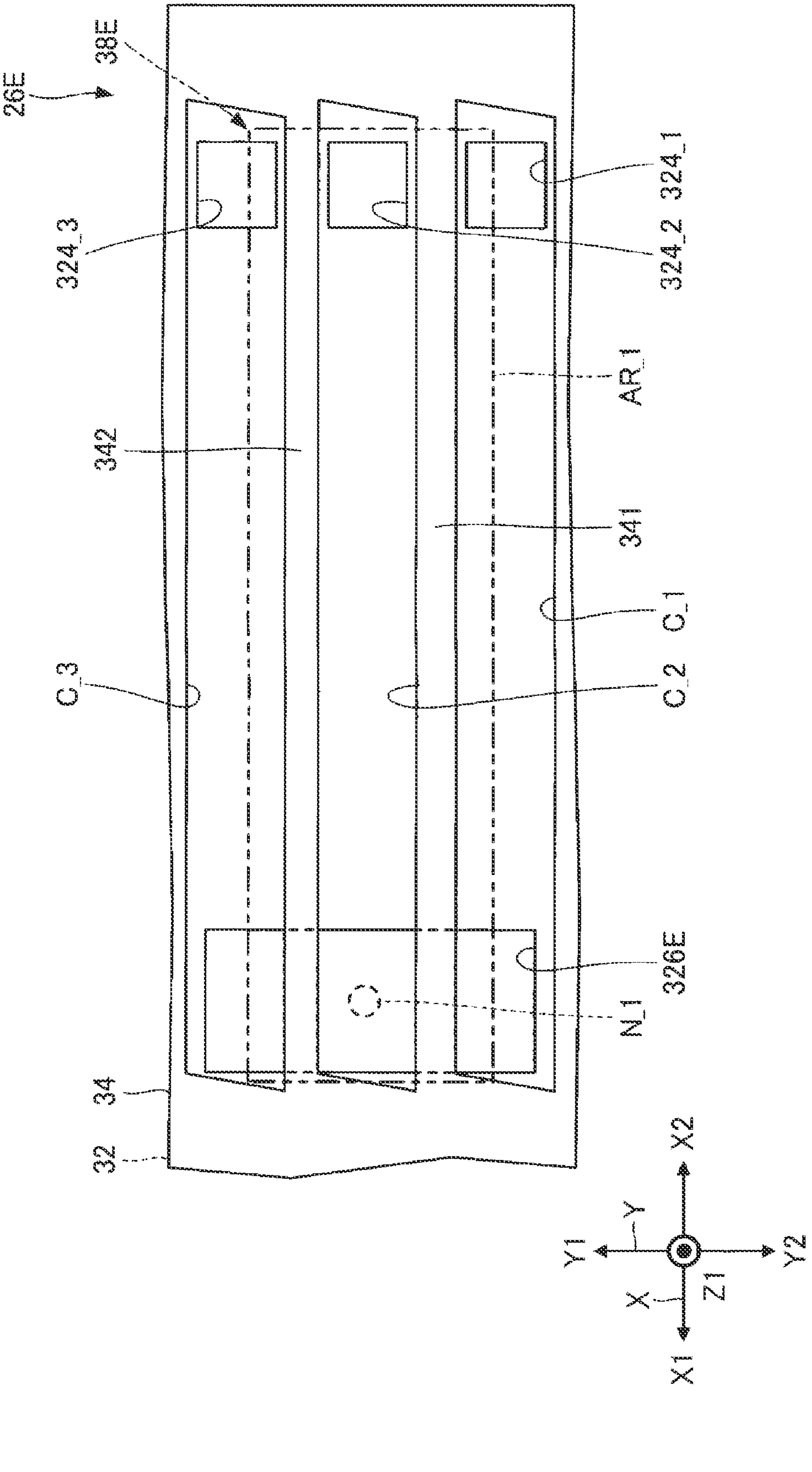
FIG. 10 is a plan view that illustrates correspondences between a nozzle, a pressure compartment, and a piezoelectric element of a liquid ejecting head according to a second modification example.

FIG. 10 is a plan view that illustrates correspondences between the nozzle N, the pressure compartment C, and the piezoelectric element 38 of a liquid ejecting head 26E according to a second modification example. The liquid ejecting head 26E is the same as the liquid ejecting head 26 according to the first embodiment described earlier except that the second nozzle N_2 is omitted and that the liquid ejecting head 26E includes a piezoelectric element 38E in place of the piezoelectric element 38. Except for different arrangement of the first active region AR_1, the piezoelectric element 38E is the same as the piezoelectric element 38.

In the second modification example, the first pressure compartment C_1, the second pressure compartment C_2, and the third pressure compartment C_3 are put into a group corresponding to the first nozzle N_1, and the first active region AR_1 is provided for the group.

That is, the plurality of pressure compartments C of the liquid ejecting head 26E includes the third pressure compartment C_3 located next to the second pressure compartment C_2 in the Y1 direction besides the first pressure compartment C_1 and the second pressure compartment C_2. The first nozzle N_1 is in communication with the third pressure compartment C_3 besides the first pressure compartment C_1 and the second pressure compartment C_2. The first active region AR_1 is located to span from at least a part of the first pressure compartment C_1 to at least a part of the second pressure compartment C_2 and to at least a part of the third pressure compartment C_3 as viewed in the Z1 direction. Therefore, it is possible to eject the liquid from the first nozzle N_1 by utilizing the pressure of the first pressure compartment C_1, the second pressure compartment C_2, and the third pressure compartment C_3. The second modification example described above also makes it possible to reduce deviation in ejection characteristics due to a manufacturing error.

5-3. Third Modification Example

Figure 11:
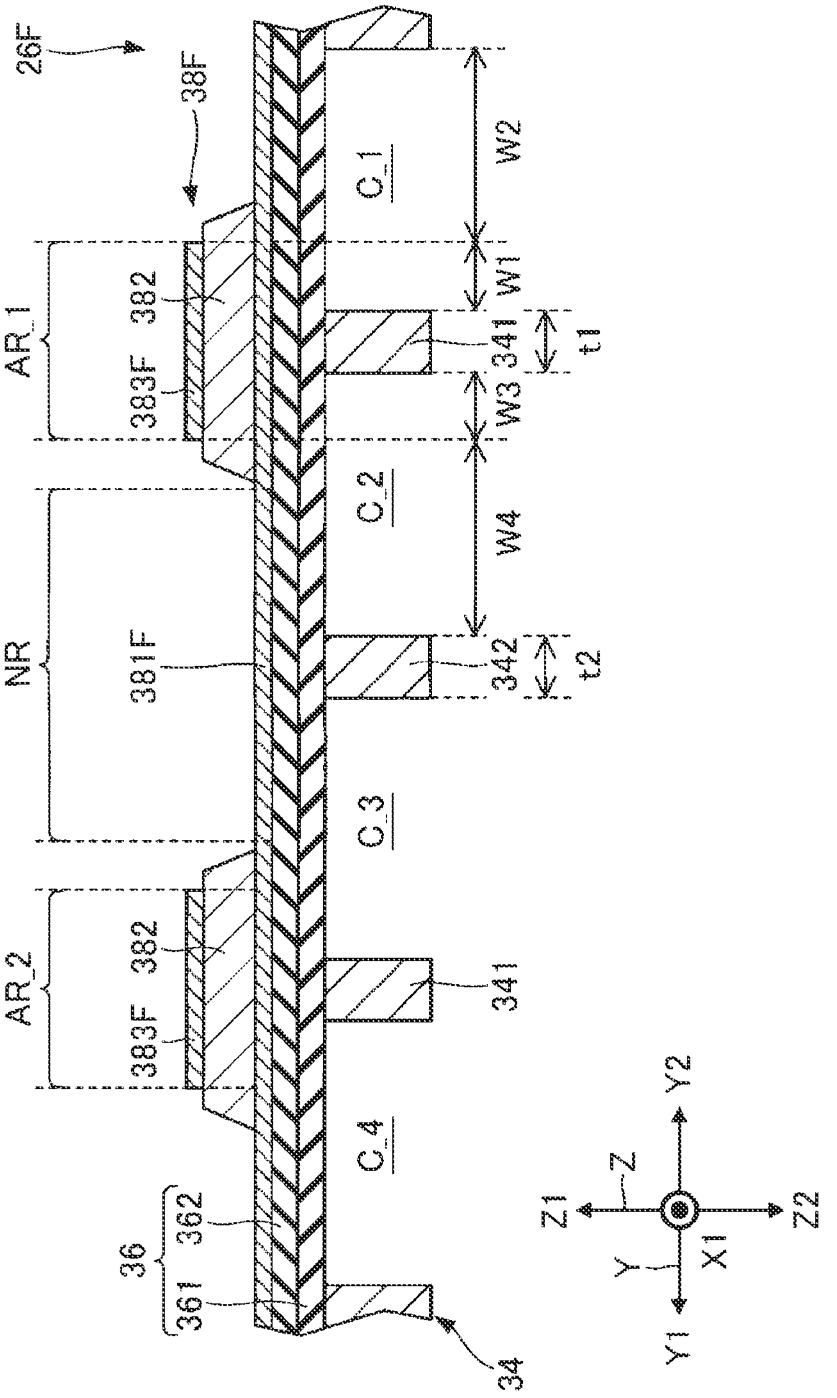
FIG. 11 is a cross-sectional view of a part of a liquid ejecting head according to a third modification example.

FIG. 11 is a cross-sectional view of a part of a liquid ejecting head 26F according to a third modification example. The liquid ejecting head 26F is the same as the liquid ejecting head 26 according to the first embodiment described earlier except that the liquid ejecting head 26F includes a piezoelectric element 38F in place of the piezoelectric element 38. The piezoelectric element 38F includes a first electrode 381F, the piezoelectric body 382, and a plurality of second electrodes 383F. The first electrode 381F, the piezoelectric body 382, and the plurality of second electrodes 383F are stacked in this order in the Z1 direction.

In the present embodiment, the first electrodes 381F, which is a common electrode, is disposed between the piezoelectric body 382 and the diaphragm 36. Therefore, as compared with a structure in which individual electrodes are disposed between the piezoelectric body 382 and the diaphragm 36, it is easier to reduce the size of the piezoelectric body 382 that does not contribute to driving. Consequently, it is possible to increase the drive efficiency of the liquid ejecting head 26F.

The third modification example described above also makes it possible to reduce deviation in ejection characteristics due to a manufacturing error. Although the piezoelectric body exists between the individual electrodes and the common electrode in the structure described above, the scope of the present modification example is not limited thereto. The piezoelectric body may exist between an individual electrode and another individual electrode.

5-4. Fourth Modification Example

Figure 12:
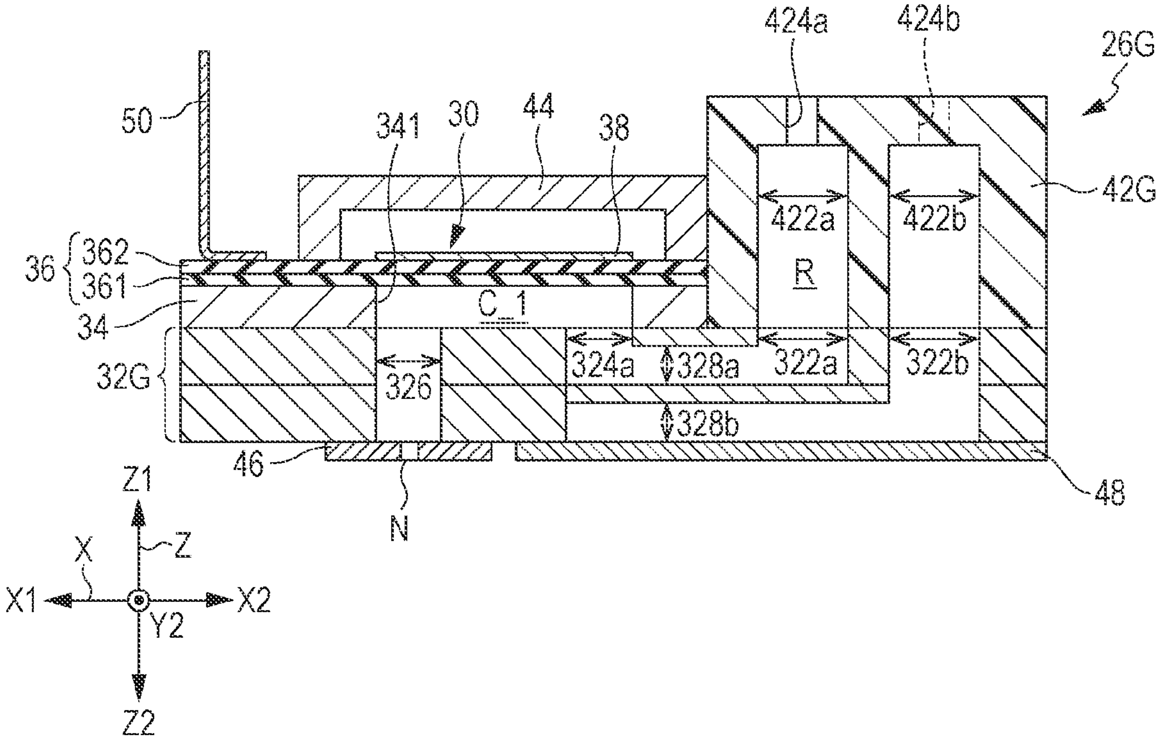
FIG. 12 is a cross-sectional view of a liquid ejecting head according to a fourth modification example.
Figure 13:
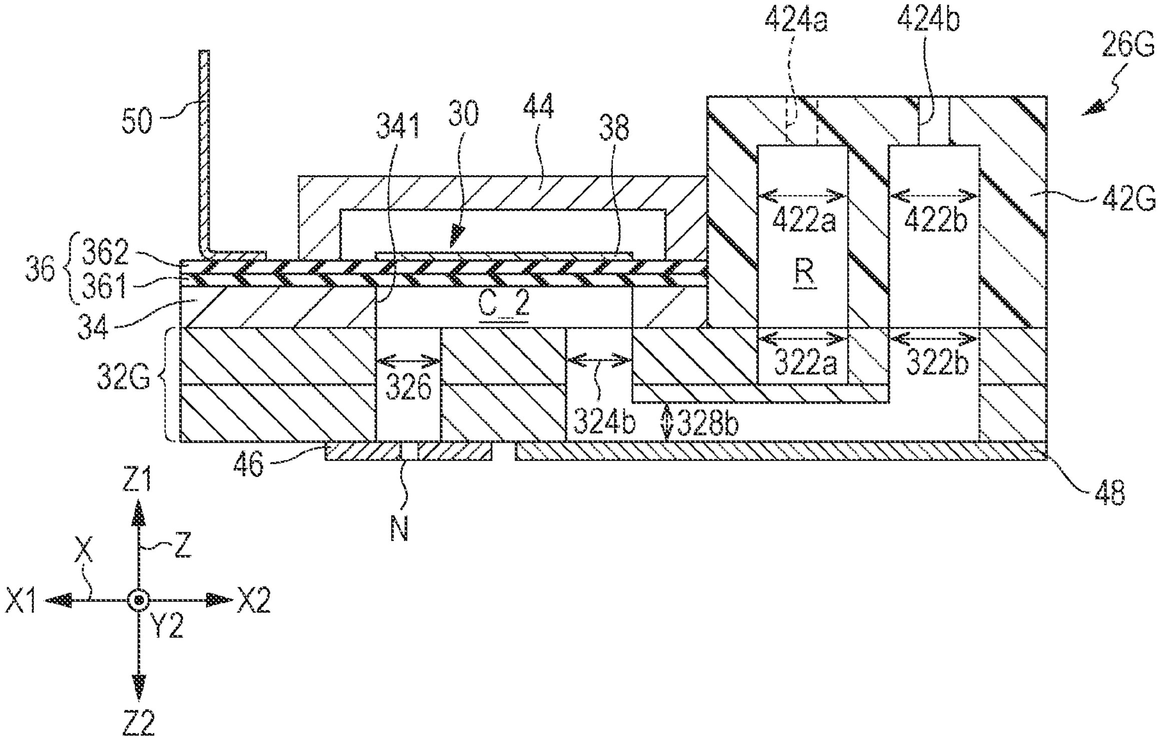
FIG. 13 is a cross-sectional view of the liquid ejecting head according to the fourth modification example.

Each of FIGS. 12 and 13 is a cross-sectional view of a liquid ejecting head 26G according to a fourth modification example. FIG. 12 depicts a cross section of the liquid ejecting head 26G taken along an X-Z plane passing through the first pressure compartment C_1. FIG. 13 depicts a cross section of the liquid ejecting head 26G taken along an X-Z plane passing through the second pressure compartment C_2.

The liquid ejecting head 26G is the same as the liquid ejecting head 26 according to the first embodiment described earlier except for its ink-circulating structure. More specifically, the liquid ejecting head 26G is the same as the liquid ejecting head 26 according to the first embodiment described earlier except that the liquid ejecting head 26G includes a communication plate 32G and a casing portion 42G in place of the communication plate 32 and the casing portion 42.

The communication plate 32G is the same as the communication plate 32 described earlier except that each of the opening portion 322, the plurality of supply flow passages 324, and the relay flow passage 328 is split into a segment for liquid supply and a segment for liquid drainage. The plurality of communication passages of the communication plate 32G further includes a first supply passage 324*a*, through which the liquid is supplied to the first pressure compartment C_1, and a first drainage passage 324*b*, through which the liquid flows out of the second pressure compartment C_2. Because of this structure, it is possible to circulate the liquid through the first pressure compartment C_1 and the second pressure compartment C_2. This makes it easier to keep the characteristics of liquid ejection from the first nozzle N_1 good for a long time. To the first supply passage 324*a*, ink is supplied through an opening portion 322*a* and a relay flow passage 328*a*, which are provided in the communication plate 32G, from an inlet 424*a* and a containing portion 422*a*, which are provided in the casing portion 42G. Ink in the first drainage passage 324*b* flows through a relay flow passage 328*b* and an opening portion 322*b*, which are provided in the communication plate 32G, flows next through a containing portion 422*b*, and then goes out from an outlet 424*b* provided in the casing portion 42G.

One of the first pressure compartment C_1 and the second pressure compartment C_2, specifically, the first pressure compartment C_1, has positive pressure. The other, specifically, the second pressure compartment C_2, has negative pressure. This pressure configuration causes a part of the liquid to flow out from the first nozzle N_1. The circulation of the liquid through the first pressure compartment C_1 and the second pressure compartment C_2 makes it easier to keep the characteristics of liquid ejection from the first nozzle N_1 good for a long time. The fourth modification example described above also makes it possible to reduce deviation in ejection characteristics due to a manufacturing error.

5-5. Fifth Modification Example

Figure 14:
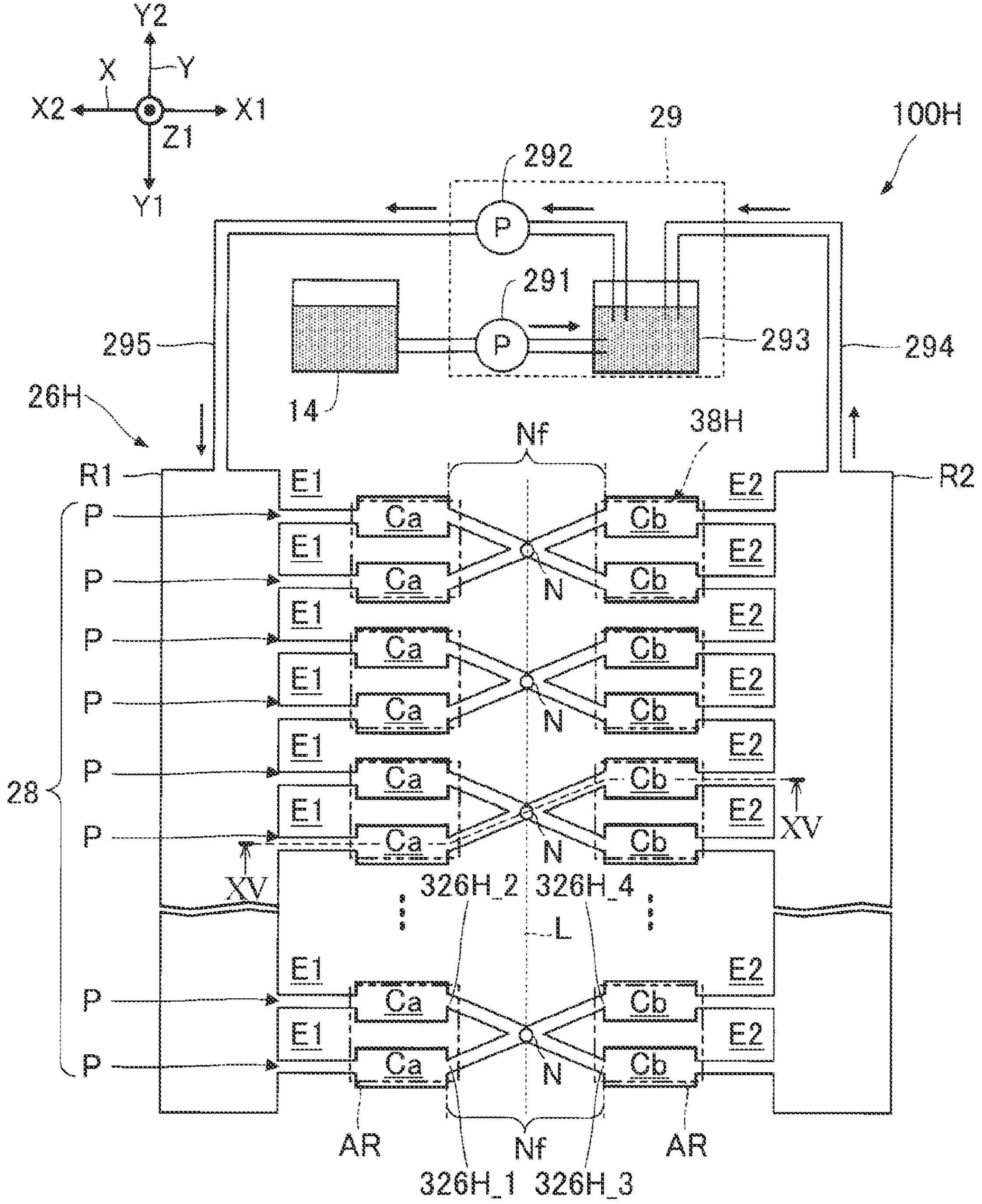
FIG. 14 is a diagram for explaining the flow passages of a liquid ejecting apparatus according to a fifth modification example.

FIG. 14 is a diagram for explaining the flow passages of a liquid ejecting apparatus 100H according to a fifth modification example. The liquid ejecting apparatus 100H is the same as the liquid ejecting apparatus 100 according to the first embodiment described earlier except that the liquid ejecting apparatus 100H includes a liquid ejecting head 26H and a circulation mechanism 29 in place of the liquid ejecting head 26. As illustrated in FIG. 14, a plurality of nozzles N, a plurality of individual flow passages P, a first common reservoir R1, and a second common reservoir R2 are provided in the liquid ejecting head 26H. In addition, the circulation mechanism 29 is connected to the liquid ejecting head 26H. In FIG. 14, each active region AR constituting the first active region AR_1 or the second active region AR_2 described earlier is shown by broken-line illustration.

The liquid ejecting head 26H includes the plurality of nozzles N. Corresponding two individual flow passages P are in communication with each of the plurality of nozzles N. The two individual flow passages P intersect with each other at the middle thereof. The nozzle N is provided at the intersection.

Each of the plurality of individual flow passages P includes a pressure compartment Ca, a pressure compartment Cb, and a nozzle flow passage Nf. Each of the pressure compartment Ca and the pressure compartment Cb has the same structure as that of the pressure compartment C described earlier. One of the respective pressure compartments Ca of the above-described two individual flow passages P intersecting with each other is an example of "a first pressure compartment". The other pressure compartment Ca is an example of "a second pressure compartment". Similarly, one of the respective pressure compartments Cb of the above-described two individual flow passages P intersecting with each other is an example of "a fifth pressure compartment", and the other pressure compartment Cb is an example of "a sixth pressure compartment".

The pressure compartment Ca and the pressure compartment Cb of each of the plurality of individual flow passages P are in communication with each other via the nozzle flow passage Nf. The pressure compartment Ca corresponding to the first pressure compartment is in communication with the nozzle flow passage Nf via a first communication passage 326H_1. The pressure compartment Ca corresponding to the second pressure compartment is in communication with the nozzle flow passage Nf via a second communication passage 326H_2. The pressure compartment Cb corresponding to the fifth pressure compartment is in communication with the nozzle flow passage Nf via a third communication passage 326H_3. The pressure compartment Cb corresponding to the sixth pressure compartment is in communication with the nozzle flow passage Nf via a fourth communication passage 326H_4. The nozzle N is provided on each of the plurality of nozzle flow passages Nf. On each of the plurality of nozzle flow passages Nf, a change in pressure inside the pressure compartment Ca and the pressure compartment Cb described earlier causes the ejection of ink from the nozzle N.

The first common reservoir R1 and the second common reservoir R2 are in communication with each of the plurality of individual flow passages P. Ink that is to be supplied to each of the plurality of individual flow passages P is pooled in the first common reservoir R1 serving as a liquid space. The second common reservoir R2 is connected to the X1-directional end of each of the plurality of individual flow passages P. Ink that is discharged from each of the plurality of individual flow passages P without being ejected is pooled in the second common reservoir R2 serving as a liquid space.

The circulation mechanism 29 is connected to the first common reservoir R1 and the second common reservoir R2. The circulation mechanism 29 is a mechanism configured to supply ink to the first common reservoir R1 and configured to collect the ink from the second common reservoir R2 for the purpose of supplying the collected ink to the first common reservoir R1 again. The circulation mechanism 29 includes a first supply pump 291, a second supply pump 292, a pooling container 293, a collection flow passage 294, and a supply flow passage 295.

The first supply pump 291 is a pump that supplies ink contained in the liquid container 14 to the pooling container 293. The pooling container 293 is a sub tank that temporarily contains the ink supplied from the liquid container 14. The collection flow passage 294 is a flow passage through which the second common reservoir R2 is in communication with the pooling container 263. The ink is collected from the second common reservoir R2 into the pooling container 263 through the collection flow passage 294. The ink contained in the liquid container 14 is supplied to the pooling container 293 by the first supply pump 291. In addition, the ink discharged into the second common reservoir R2 from each of the plurality of individual flow passages P is supplied to the pooling container 293 through the collection flow passage 294. The second supply pump 292 is a pump that sends out the ink pooled in the pooling container 293. The supply flow passage 295 is a flow passage through which the pooling container 293 is in communication with the first common reservoir R1. Ink is supplied from the pooling container 293 to the first common reservoir R1 through the supply flow passage 295.

Figure 15:
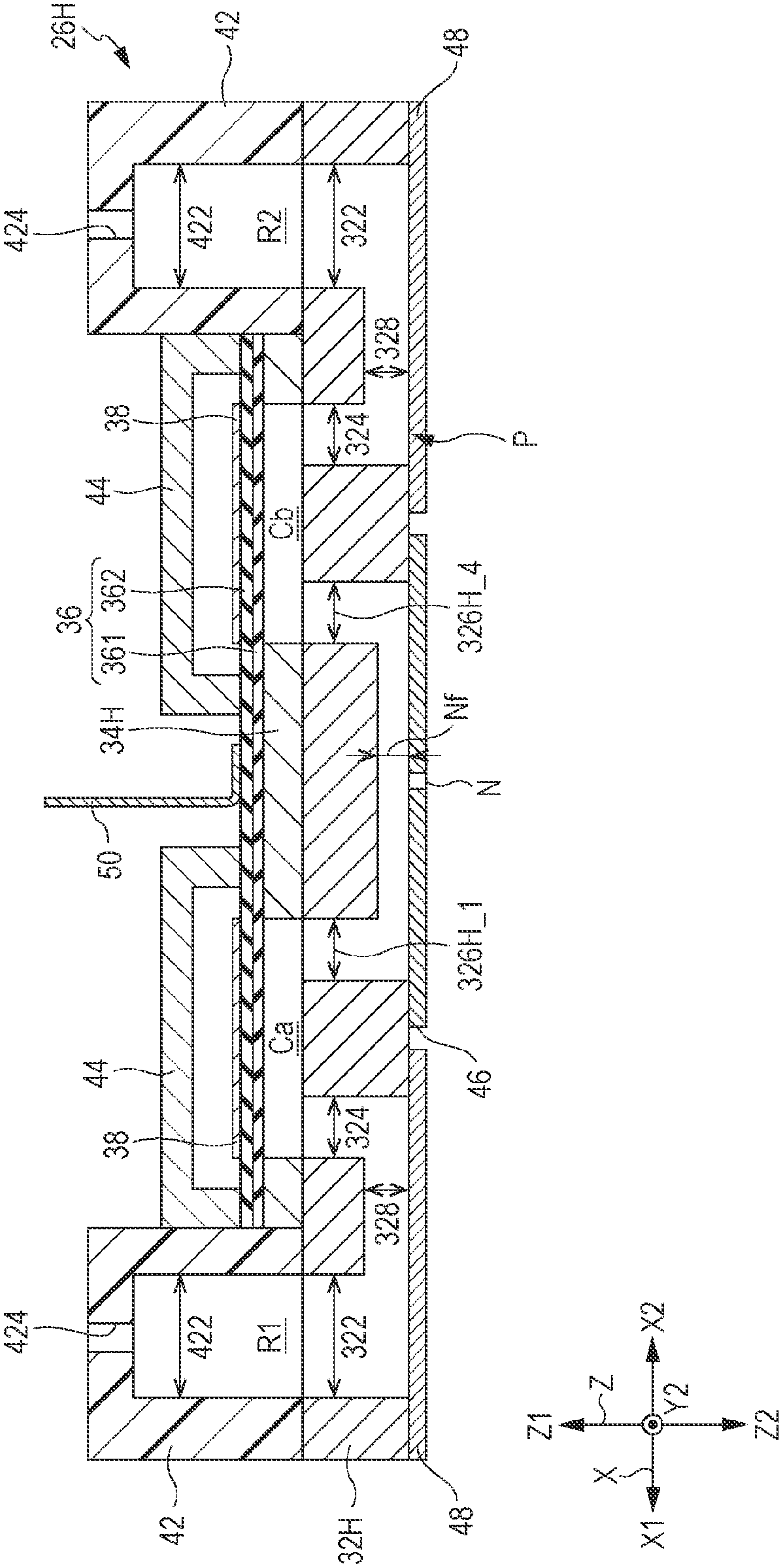
FIG. 15 is a cross-sectional view of a liquid ejecting head according to the fifth modification example.

FIG. 15 is a cross-sectional view of the liquid ejecting head 26H according to the fifth modification example. As illustrated in FIG. 15, the liquid ejecting head 26H has a structure that resembles a combination of two liquid ejecting heads 26 according to the first embodiment described earlier, wherein these two heads are combined symmetrically with respect to the nozzles N. However, as has already been described, the pressure compartment Ca and the pressure compartment Cb are in communication with each other via the nozzle flow passage Nf and two communication passages.

As illustrated in FIG. 15, the liquid ejecting head 26H includes a pressure compartment substrate 34H, in which the pressure compartments Ca and the pressure compartments Cb are provided, and a communication plate 32H, in which the first communication passages 326H_1 and the second communication passages 326H_2 are provided.

As described above, the liquid ejecting head 26H includes the communication plate 32H disposed between the nozzle substrate 46 and the pressure compartment substrate 34H. A plurality of communication passages is provided in the communication plate 32H. The plurality of communication passages includes the nozzle flow passage Nf, which is an example of "a first nozzle flow passage" that is in communication with the nozzle N that is an example of "a first nozzle", the first communication passage 326H_1 for communication between the pressure compartment Ca or the pressure compartment Cb corresponding to "a first pressure compartment" and the nozzle flow passage Nf, and the second communication passage 326H_2 for communication between the pressure compartment Ca or the pressure compartment Cb corresponding to "a second pressure compartment" and the nozzle flow passage Nf. Therefore, as compared with a structure in which a flow passage for communication between the first pressure compartment and the second pressure compartment is provided in the pressure compartment substrate 34H, it is possible to better communicate the pressure of these pressure compartments to the nozzle N.

5-6. Sixth Modification Example

In the foregoing embodiments, the liquid ejecting apparatus 100 that is a so-called serial-type liquid ejecting apparatus configured to reciprocate the traveler 242 on which the liquid ejecting head 26 is mounted has been described as examples. However, the present disclosure may be applied to a so-called line-type liquid ejecting apparatus in which the plural nozzles N are arranged throughout the entire width of the medium 12.

5-7. Seventh Modification Example

The liquid ejecting apparatus 100 disclosed as examples in the foregoing embodiments can be applied to not only print-only machines but also various kinds of equipment such as facsimiles and copiers, etc. The scope of application and use of the liquid ejecting apparatus according to the present disclosure is not limited to printing. For example, a liquid ejecting apparatus that ejects a colorant solution can be used as an apparatus for manufacturing a color filter of a liquid crystal display device. A liquid ejecting apparatus that ejects a solution of a conductive material can be used as a manufacturing apparatus for forming wiring lines and electrodes of a wiring substrate.

What is claimed is:

1. A liquid ejecting head, comprising:

a nozzle substrate in which a plurality of nozzles arranged in a first direction is provided;

a pressure compartment substrate in which a plurality of pressure compartments arranged in the first direction is provided;

a diaphragm; and a piezoelectric element that includes a common electrode provided in common to the plurality of pressure compartments, a plurality of individual electrodes provided individually for the plurality of pressure compartments, and a piezoelectric body sandwiched between the common electrode and the plurality of individual electrodes; wherein the nozzle substrate, the pressure compartment substrate, the diaphragm, and the piezoelectric element are stacked in a second direction intersecting with the first direction, the plurality of pressure compartments includes a first pressure compartment and a second pressure compartment, the second pressure compartment being located next to the first pressure compartment in the first direction, the plurality of nozzles includes a first nozzle that is in communication with the first pressure compartment and the second pressure compartment in a shared manner, the piezoelectric element includes a first active region where the piezoelectric body is sandwiched between the common electrode and, among the plurality of individual electrodes, a first individual electrode, the first active region is located to span from at least a part of the first pressure compartment to at least a part of the second pressure compartment as viewed in the second direction, and the pressure compartment substrate includes a first partition wall located in the first active region for partitioning between the first pressure compartment and the second pressure compartment.

2. The liquid ejecting head according to claim 1, wherein the plurality of pressure compartments further includes a third pressure compartment located next to the second pressure compartment in the first direction, the plurality of nozzles includes a second nozzle located next to the first nozzle in the first direction, the second nozzle is neither in communication with the first pressure compartment nor in communication with the second pressure compartment, and is in communication with the third pressure compartment, and the first active region does not span to the third pressure compartment as viewed in the second direction.

3. The liquid ejecting head according to claim 2, wherein the plurality of pressure compartments further includes a fourth pressure compartment located next to the third pressure compartment in the first direction, the second nozzle is in communication with the third pressure compartment and the fourth pressure compartment in a shared manner, the piezoelectric element includes a second active region where the piezoelectric body is sandwiched between the common electrode and, among the plurality of individual electrodes, a second individual electrode, and the second active region is located to span from at least a part of the third pressure compartment to at least a part of the fourth pressure compartment.

4. The liquid ejecting head according to claim 3, wherein no other piezoelectric body is provided as the piezoelectric body between the piezoelectric body in the first active region and the piezoelectric body in the second active region in the first direction.

5. The liquid ejecting head according to claim 3, wherein the piezoelectric element includes a mid region where other piezoelectric body is provided as the piezoelectric body between the piezoelectric body in the first active region and the piezoelectric body in the second active region in the first direction, and the piezoelectric body in the mid region is continuous to neither of the piezoelectric body in the first active region and the piezoelectric body in the second active region.

6. The liquid ejecting head according to claim 5, wherein the mid region includes a conductor portion made of a same material as that of the plurality of individual electrodes at a position where the piezoelectric body is sandwiched between the common electrode and the conductor portion, and the conductor portion is electrically coupled to the common electrode.

7. The liquid ejecting head according to claim 5, wherein the mid region does not include a portion made of a same material as that of the plurality of individual electrodes at a position where the piezoelectric body is sandwiched between the common electrode and the portion.

8. The liquid ejecting head according to claim 3, wherein the piezoelectric element includes a non-active region located between the first active region and the second active region in the first direction, the piezoelectric body includes a portion provided in the non-active region in such a way as to be continuous to the first active region and the second active region, and the plurality of individual electrodes is not provided in the non-active region.

9. The liquid ejecting head according to claim 2, wherein the pressure compartment substrate includes a second partition wall for partitioning between the second pressure compartment and the third pressure compartment, and a thickness of the first partition wall in the first direction is less than a thickness of the second partition wall in the first direction.

10. The liquid ejecting head according to claim 1, wherein a width in the first direction of an overlapping part of the first pressure compartment that overlaps with the first active region as viewed in the second direction is less than a width in the first direction of a non-overlapping part of the first pressure compartment that does not overlap with the first active region as viewed in the second direction, and a width in the first direction of an overlapping part of the second pressure compartment that overlaps with the first active region as viewed in the second direction is less than a width in the first direction of a non-overlapping part of the second pressure compartment that does not overlap with the first active region as viewed in the second direction.

11. The liquid ejecting head according to claim 1, wherein a width in the first direction of an overlapping part of the first pressure compartment that overlaps with the first active region as viewed in the second direction is greater than a width in the first direction of a non-overlapping part of the first pressure compartment that does not overlap with the first active region as viewed in the second direction, and a width in the first direction of an overlapping part of the second pressure compartment that overlaps with the first active region as viewed in the second direction is greater than a width in the first direction of a non-overlapping part of the second pressure compartment that does not overlap with the first active region as viewed in the second direction.

12. The liquid ejecting head according to claim 1, further comprising:

a communication plate disposed between the nozzle substrate and the pressure compartment substrate, a plurality of communication passages being provided in the communication plate; wherein the plurality of communication passages includes a first nozzle flow passage that is in communication with the first nozzle, a first communication passage for communication between the first pressure compartment and the first nozzle flow passage, and a second communication passage for communication between the second pressure compartment and the first nozzle flow passage.

13. The liquid ejecting head according to claim 12, wherein the plurality of communication passages further includes a first supply passage through which liquid is supplied to the first pressure compartment and a second supply passage through which the liquid is supplied to the second pressure compartment.

14. The liquid ejecting head according to claim 12, wherein the plurality of communication passages further includes a first supply passage through which liquid is supplied to the first pressure compartment and a first drainage passage through which the liquid goes out from the second pressure compartment.

15. The liquid ejecting head according to claim 1, wherein the plurality of pressure compartments further includes a third pressure compartment located next to the second pressure compartment in the first direction, the first nozzle is in communication with the third pressure compartment, and the first active region is located to span from at least a part of the first pressure compartment to at least a part of the second pressure compartment and to at least a part of the third pressure compartment as viewed in the second direction.

16. The liquid ejecting head according to claim 1, wherein the plurality of individual electrodes is disposed between the piezoelectric body and the diaphragm.

17. The liquid ejecting head according to claim 1, wherein the common electrode is disposed between the piezoelectric body and the diaphragm.

18. A liquid ejecting apparatus, comprising:

the liquid ejecting head according to claim 1; and a control section that controls operation of ejecting liquid from the liquid ejecting head according to claim 1.

19. The liquid ejecting apparatus according to claim 18, wherein both of the first pressure compartment and the second pressure compartment have positive pressure.

20. The liquid ejecting apparatus according to claim 18, wherein one of the first pressure compartment and the second pressure compartment has positive pressure, and other of the first pressure compartment and the second pressure compartment has negative pressure.

* * * * *